US011513426B2

(12) United States Patent
Nakamura et al.

(10) Patent No.: US 11,513,426 B2
(45) Date of Patent: Nov. 29, 2022

(54) LENS APPARATUS, IMAGE PICKUP APPARATUS, PROCESSING APPARATUS, AND CAMERA APPARATUS

(71) Applicant: CANON KABUSHIKI KAISHA, Tokyo (JP)

(72) Inventors: Tomoyuki Nakamura, Kanagawa (JP); Koichi Sakuma, Kanagawa (JP); Kei Kinoshita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 17/274,547

(22) PCT Filed: Sep. 10, 2019

(86) PCT No.: PCT/JP2019/035442
§ 371 (c)(1),
(2) Date: Mar. 9, 2021

(87) PCT Pub. No.: WO2020/054684
PCT Pub. Date: Mar. 19, 2020

(65) Prior Publication Data

US 2022/0050360 A1 Feb. 17, 2022

(30) Foreign Application Priority Data

Sep. 11, 2018 (JP) ............................ JP2018-169308
Jan. 31, 2019 (JP) ............................ JP2019-015848

(51) Int. Cl.
*G03B 17/14* (2021.01)
*H04N 5/225* (2006.01)
(Continued)

(52) U.S. Cl.
CPC ........... *G03B 17/14* (2013.01); *H04N 5/2254* (2013.01); *H04N 5/2351* (2013.01); *H04N 5/243* (2013.01)

(58) Field of Classification Search
None
See application file for complete search history.

(56) References Cited

U.S. PATENT DOCUMENTS 7,990,438 B2 8/2011 Kamo
8,031,256 B2 10/2011 Hosoi et al.
(Continued)

FOREIGN PATENT DOCUMENTS

CN 101166235 A 4/2008
CN 102082902 A 6/2011
(Continued)

OTHER PUBLICATIONS

Office Action issued in Chinese Appln. No. 201980058452.6 dated Oct. 11, 2021. English translation provided.
(Continued)

*Primary Examiner* — Twyler L Haskins
*Assistant Examiner* — Dwight Alex C Tejano
(74) *Attorney, Agent, or Firm* — Rossi, Kimms & McDowell LLP

(57) ABSTRACT

Provided is a lens apparatus attachable and removable to a camera apparatus, the lens apparatus comprising a communication device configured to transmit, to an external device, information for light amount compensation of image data obtained by image pickup in the camera apparatus, in which the information includes information of a coefficient $A_0$ of a term of 0-th-order with respect to an image height in a polynomial of n-th-order with respect to the image height, and in which a conditional expression $$0.7<A_0(Z)\times(Fw/F(Z))^2<1.3$$

(Continued)

START S200
LIGHT AMOUNT CORRECTION ON ? S210
No
END S215
Yes
READ FOCUS, ZOOM, IRIS AND EXTENDER PARAMETERS S220
READ COEFFICIENT DATA CORRESPONDING TO PARAMETERS, THEN SEND PARAMETERS TO CALCULATOR IN CAMERA APPARATUS S230
READ GAIN COEFFICIENTS FROM GAIN OPERATION DEVICE, THEN SEND PARAMETERS TO CALCULATOR IN CAMERA APPARATUS S240
CALCULATOR IN CAMERA APPARATUS RECEIVES ELECTRIC SIGNAL FROM IMAGE PICKUP ELEMENT S250
READ COEFFICIENT DATA AND GAIN COEFFICIENT S260
EXECUTE LIGHT AMOUNT CORRECTION S270
LIGHT AMOUNT CORRECTION PROCESSING IN CAMERA APPARATUS is satisfied where $A_0(Z)$ represents the coefficient $A_0$ at a zoom state Z, F(Z) represents an effective F-number at the zoom state Z, and Fw represents an effective F-number at a wide angle end.

29 Claims, 15 Drawing Sheets

(51) Int. Cl.
*H04N 5/235* (2006.01)
*H04N 5/243* (2006.01)

(56) References Cited

U.S. PATENT DOCUMENTS 8,355,058 B2 1/2013 Shirai
8,508,655 B2 8/2013 Suto
8,781,313 B2 7/2014 Uchiyama
9,965,833 B2 5/2018 Sugimoto
10,244,157 B2 3/2019 Sugita
2001/0055157 A1* 12/2001 Shirasuna ...... G02B 15/144105 359/566
2003/0142412 A1* 7/2003 Shirasuna ...... G02B 15/143105 359/690
2003/0175021 A1* 9/2003 Hamano ............. G02B 15/173 396/72
2008/0144188 A1* 6/2008 Hamano ........ G02B 15/143105 359/683
2009/0009633 A1 1/2009 Suto
2009/0034097 A1* 2/2009 Yakita .................... G02B 7/105 359/705
2015/0181128 A1 6/2015 Kaku
2016/0098819 A1 4/2016 Sugimoto
2017/0168269 A1* 6/2017 Yasui ..................... G02B 7/021
2020/0081222 A1* 3/2020 Sakuma ............. H04N 5/23209

FOREIGN PATENT DOCUMENTS

CN 103424954 A 12/2013
CN 105165003 A 12/2015
CN 105407265 A 3/2016
EP 3035664 A1 6/2016
JP H11164194 A 6/1999
JP 2005217504 A 8/2005
JP 2008096907 A 4/2008
JP 2008172321 A 7/2008
JP 2010122458 A 6/2010
JP 2017120292 A 7/2017

OTHER PUBLICATIONS

Extended European search report issued in European Appln. No. 19859721.3 dated Jun. 10, 2022.
International Search Report issued in Intl. Appln. No. PCT/JP2019/035442 dated Dec. 3, 2019.
Written Opinion issued in Intl. Appln. No. PCT/JP2019/035442 dated Dec. 3, 2019.
Office Action issued in Japanese Appln. No. 2018-169308 dated Oct. 5, 2021.
International Preliminary Report on Patentability issued in Int. Appln. No. PCT/JP2019/035442 dated Mar. 25, 2021.

* cited by examiner 100
200
250
IMAGE PICKUP ELEMENT
210
CALCULATOR IN CAMERA APPARATUS
240
DATA STORAGE
220
CAMERA COMMUNICATION DEVICE
UF
UZ
UI
UE
101
FOCUS OBTAINING DEVICE
102
ZOOM OBTAINING DEVICE
103
IRIS OBTAINING DEVICE
104
EXTENDER OBTAINING DEVICE
110
CALCULATOR IN LENS APPARATUS
120
LENS COMMUNICATION DEVICE
140
STORAGE

FIG. 15

| | |
|---|---|
| FOCUS STATE DIVISION NUMBER DATA Fnum | DIVISION NUMBER DATA |
| ZOOM STATE DIVISION NUMBER DATA Znum | |
| APERTURE STOP STATE DIVISION NUMBER DATA Inum | |
| FOCUS STATE DIVISION POINT DATA F[0] | DIVISION POINT DATA |
| . . . | |
| FOCUS STATE DIVISION POINT DATA F[Fnum-1] | |
| ZOOM STATE DIVISION NUMBER DATA Z[0] | |
| . . . | |
| ZOOM STATE DIVISION POINT DATA Z[Znum-1] | |
| APERTURE STOP STATE DIVISION POINT DATA I[0] | |
| . . . | |
| APERTURE STOP STATE DIVISION POINT DATA I[Inum-1] | |
| 0-th ORDER COEFFICIENT $A_0$[0][0][0] | COEFFICIENT DATA |
| FIRST ORDER COEFFICIENT $A_1$[0][0][0] | |
| . . . | |
| n ORDER COEFFICIENT $A_n$[0][0][0] | |
| 0-th ORDER COEFFICIENT $A_0$[1][0][0] | |
| FIRST ORDER COEFFICIENT $A_1$[1][0][0] | |
| . . . | |
| n ORDER COEFFICIENT $A_n$[1][0][0] | |
| . . . | |
| 0-th ORDER COEFFICIENT $A_0$[Fnum-1][Znum-1][Inum-1] | |
| FIRST ORDER COEFFICIENT $A_1$[Fnum-1][Znum-1][Inum-1] | |
| . . . | |
| n ORDER COEFFICIENT $A_n$[Fnum-1][Znum-1][Inum-1] | |

LENS APPARATUS, IMAGE PICKUP APPARATUS, PROCESSING APPARATUS, AND CAMERA APPARATUS

TECHNICAL FIELD

The present invention relates to a lens apparatus, an image pickup apparatus, a processing apparatus, and a camera apparatus.

BACKGROUND ART

An image pickup lens is generally designed so that the light amount is smaller in a peripheral portion of an image plane than at the center of the image plane in order to prevent the lens from increasing in size. An example thereof is shown in FIG. 9. FIG. 9 is a graph for showing the ratios of light amounts at respective image heights to a central light amount that are observed when a stop is opened to full aperture and when the stop is opened at F2.8. The degree of a drop in light amount in the peripheral portion (at a high image height) is decreased by setting the stop to a narrow aperture. The light amount in the peripheral portion varies depending not only on the stop but also on changes in a zooming parameter and in a focusing parameter.

There has been known a lens apparatus that has a function of transmitting information for compensating for the drop in light amount in the peripheral portion and information for compensating for chromatic aberration of magnification to an image pickup apparatus main body (a camera) (Patent Literature 1). There has also been known a method that employs a second-order, third-order, or fourth-order expression with respect to the image height that expresses information for light amount compensation at each image height in order to speed up the processing of compensating the light amount in the peripheral portion (Patent Literature 2).

CITATION LIST

Patent Literature

PTL 1: Japanese Patent Application Laid-Open No. 2008-96907

PTL 2: Japanese Patent Application Laid-Open No. H11-164194

SUMMARY OF INVENTION

Technical Problem

Neither of the technologies of Patent Literature 1 and Patent Literature 2 pays consideration to an image pickup lens that experiences a drop in light amount even at the center of the image plane during zooming (zoom-in) from the wide angle end to the telephoto end (a phenomenon called F drop). It is an object of the present invention to provide, for example, a lens apparatus beneficial in light amount compensation of image data obtained by pickup of an image formed thereby.

Solution to Problem

According to one aspect of the present invention, provided is a lens apparatus attachable and removable to a camera apparatus, the lens apparatus comprising a communication device configured to transmit, to an external device, information for light amount compensation of image data obtained by image pickup in the camera apparatus, in which the information includes information of a coefficient $A_0$ of a term of 0-th-order with respect to an image height in a polynomial of n-th-order with respect to the image height, and in which a conditional expression $$0.7<A_0(Z)\times(Fw/F(Z))^2<1.3$$

is satisfied where $A_0(Z)$ represents the coefficient $A_0$ at a zoom state Z, F(Z) represents an effective F-number at the zoom state Z, and Fw represents an effective F-number at a wide angle end.

Advantageous Effects of Invention

The present invention can provide a lens apparatus beneficial in light amount compensation of image data obtained by, pickup of an image formed thereby.

BRIEF DESCRIPTION OF DRAWINGS

FIG. 15 is a diagram for illustrating a configuration example of light amount compensation data.

DESCRIPTION OF EMBODIMENTS

First Embodiment

Now, exemplary embodiments of the present invention are described in detail based on the accompanying drawings.

Figure 1:
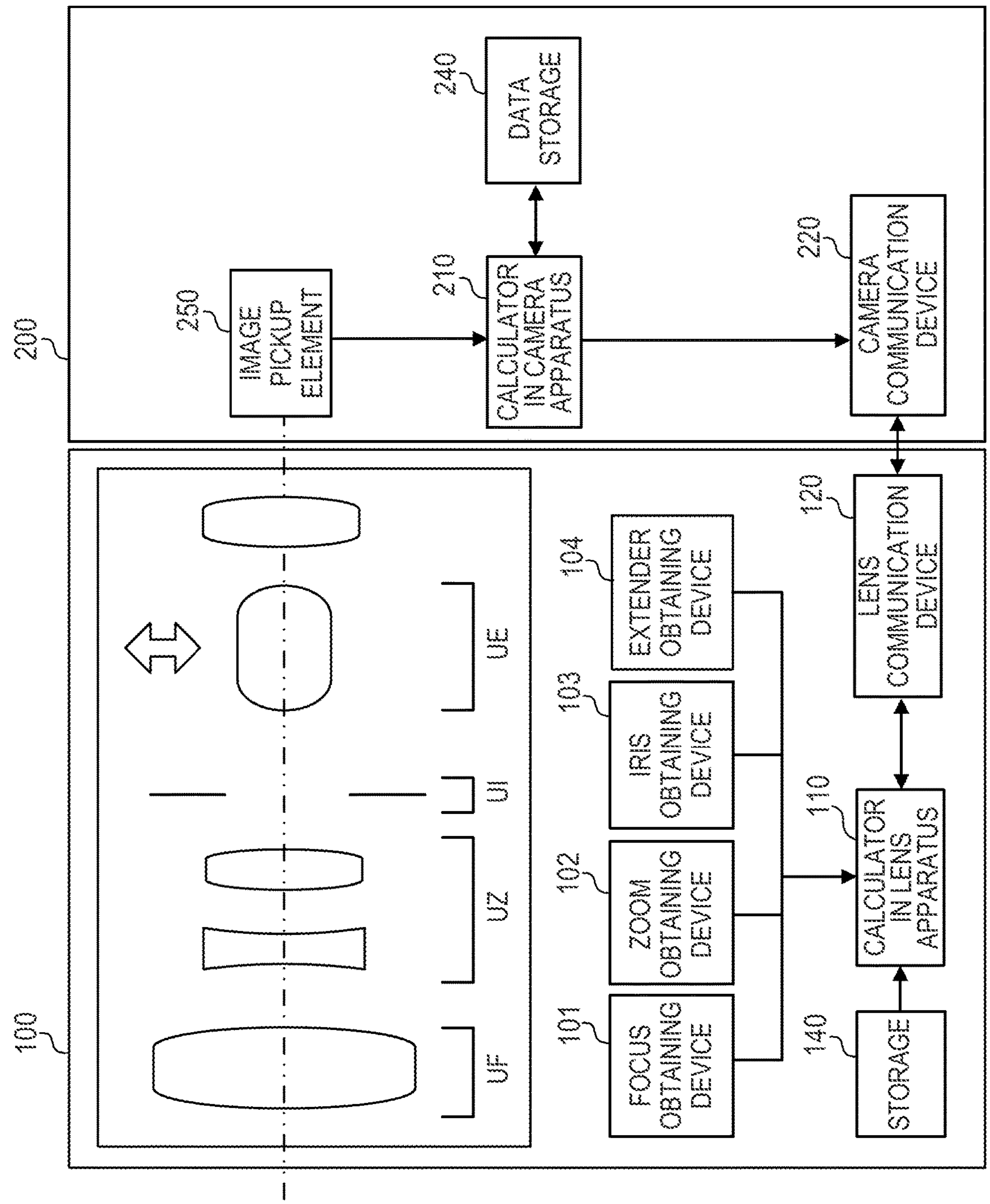
FIG. 1 is a block diagram of an image pickup apparatus according to a first embodiment of the present invention.

FIG. 1 is a block diagram of a lens apparatus 100 and camera apparatus 200 according to a first embodiment of the present invention. The lens apparatus 100 according to the present invention is removably mounted on the camera apparatus 200, to thereby form an image pickup apparatus. The lens apparatus 100 includes a focus lens unit UF, which moves along an optical axis to focus, a zoom lens unit UZ, which moves along the optical axis to zoom, and an aperture stop UI. The lens apparatus 100 also includes at least one extender lens unit UE, which is selectively insertable to and removable from an optical path, and which shifts the last focal length range of the lens apparatus in stages. A focus obtaining device 101, a zoom obtaining device 102, an iris obtaining device 103, and an extender obtaining device 104 obtain the position or state of the focus lens unit UF, the position or state of the zoom lens unit UZ, the position or state of the aperture stop UI, and the insertion/removal state of the extender lens unit UE, respectively. The obtaining devices each include an encoder, a potentiometer, a photosensor, or a similar detector.

A calculator (CPU) 110 in the lens apparatus is configured to perform various types of control of the lens apparatus. A lens communication device 120 is configured to communicate (transmit and receive) correction data for light amount correction to and from the camera apparatus 200.

A storage 140 is configured to store correction data for light amount correction that relates to the image height and that has a focus parameter, a zoom parameter, and a stop parameter. More specifically, the storage 140 is configured to store, as correction data for light amount compensation of image data, a 0-th-order coefficient to an n-th-order coefficient in an n-th-order expression (n is a non-negative integer) with respect to the image height that expresses the light amount correction amount and that has the focus state, the zoom state, the state of the stop, and the state of the extender lens unit as parameters. Details are described later.

A configuration of the camera apparatus 200 is described. A calculator (CPU) 210 in the camera apparatus is configured to perform various types of control of the lens apparatus. A camera communication device 220 is configured to hold communication to and from the lens apparatus. A data storage 240 is configured to hold coefficient data for light amount correction that is transmitted from the lens apparatus 100. An image pickup element 250 is placed on an image plane of the lens apparatus, is configured to convert an optical signal of an optical image formed by the lens apparatus into an electric signal, and includes a CCD, a CMOSr, or a similar image sensor.

In the present invention, a light amount correction amount having, for example, the light amount at an optical axis position (a position at which the image height is zero) in a given reference state as a reference is expressed by an n-th-order approximate expression relating to the image height, with the zoom state, the focus state, the state of the stop, and the state of the extender lens unit as parameters (in the embodiments, a case of using a third-order approximate expression and a fourth-order approximate expression is described for exemplification). Accordingly, a light amount correction amount D is expressed by a polynomial with respect to an image height "h" as follows:

[Math. 1]

$$D_{(Z,O,P,i)}(h) = \sum_{j=0}^{n} A_{j(Z,O,P,i)} h^j \tag{1}$$

where Z, O, P, and "i" represent the zoom state, the focus state, the state of the stop, and the state of the extender lens unit, respectively, and $A_{j(Z,\ O,\ P,\ i)}$ represents a j-th-order coefficient with respect to the image height "h". The given reference state is a state in which the zoom position is at a given position, the focus position is at a given position, and the stop value is a given value, and refers to, for example, a state in which the zoom position is at the telephoto end, focus is at infinity, and the stop is opened to full aperture. The parameter i, which indicates the state of the extender lens unit, is a parameter for recognizing a state in which no extender lens unit is inserted into an optical path and identifying which extender lens unit is inserted into the optical path. With the light amount correction amount expressed by the n-th order expression with respect to the image height, speeding up of light amount correction processing and real-time light amount correction are accomplished, and a data capacity for light amount correction can be reduced as well.

The light amount correction amount D is expressed by a third-order expression with respect to the image height "h" as follows:

$$D=A_3h^3+A_2h^2+A_1h+A_0 \tag{2},$$

where $A_3$, $A_2$, $A_1$, and $A_0$ represent the third-order coefficient, the second-order coefficient, the first-order coefficient, and the 0-th-order coefficient respectively, with respect to the image height "h". The third-order coefficient $A_3$, the second-order coefficient $A_2$, the first-order coefficient $A_1$, and the 0-th-order coefficient $A_0$ are recorded as correction data in the storage 140. As described above, the coefficients $A_3$, $A_2$, $A_1$, and $A_0$ are set for each combination of finite representative points for zooming, for focusing, and for the stop and the number of extender lens units inclusive of the presence/absence of an extender lens unit that is inserted into an optical path, and the set coefficients are recorded in the storage 140.

The correction data for light amount correction is described. The correction data for light amount correction includes coefficients of an n-th order expression with respect to the image height of four-dimensional array data that has, as axes, the optical parameter Z relating to zooming, the optical parameter O relating to focusing, the optical parameter P relating to the stop, and the optical parameter "i" relating to the extender lens unit. As the correction data for light amount correction, coefficient data including a constant term $A_{0(Z,\ O,\ P,\ i)}$ of the n-th-order expression for the optical parameters Z, O, P, and "i" is transmitted to the camera apparatus. The constant term $A_{0(Z,\ O,\ P,\ i)}$ satisfies the following conditional expression (3):

$$0.7<A_{0(Z,O,P,i)}\times(F_{(Zw,O,P,i)}/F_{(Z,O,P,i)})^2<1.3 \tag{3},$$

where $F_{(Z,\ O,\ P,\ i)}$ represents an effective F-number, Zw represents a zoom parameter of the wide angle end, and $F_{(Zw,\ O,\ P,\ i)}$ represents the effective F-number at the wide angle end.

The conditional expression (3) defines a range of values that may be taken by the coefficient data for appropriate correction when the light amount at the center of the image plane changes in response to changes in optical parameters relating to zooming, focusing, the stop, and the extender lens unit. The light amount at the center of the image plane can be corrected appropriately by satisfying the conditional expression (3). Theoretically, the light amount can be corrected accurately when the 0-th-order coefficient $A_{0(Z, O, P, i)}$, which is a constant term, satisfies the following conditional expression (4):

$$A_{0(Z,O,P,i)}=(F_{(Z,O,P,i)}/F_{(Zw,O,P,i)})^2 \quad (4).$$

However, in a situation in which the user conducts a final check, the correction is affected by, among others, the characteristics of the image pickup element, processing of the camera apparatus, and processing executed after a signal is transmitted from the camera apparatus. In addition, it is not always favorable for $A_{0(Z, O, P, i)}$ to satisfy the conditional expression (4) in consideration of overcorrection and undercorrection caused by interpolation processing when the amount of data for use in correction is limited due to restrictions on communication or the capacity of a recording apparatus.

It is therefore preferred that $A_{0(Z, O, P, i)}$ be set appropriately within the range of the conditional expression (3).

It is further preferred to set the numerical ranges of the conditional expressions (3) as follows.

$$0.9<A_{0(Z,O,P,i)}\times(F_{(Zw,O,P,i)}/F_{(Z,O,P,i)})^2<1.1 \quad (3a)$$

The coefficient data interpolated based on the optical parameters relating to zooming, focusing, the stop, and the extender lens unit may be transmitted from the lens apparatus 100 to the camera apparatus 200 any time an inquiry is received from the camera apparatus 200.

Alternatively, all coefficient data may be transmitted at once. In the case of transmitting all coefficient data to the camera apparatus 200 at once, the coefficient data is stored and held in the data storage 240 of the camera apparatus 200. The lens apparatus 100 transmits the optical parameters relating to zooming, focusing, the stop P, and the extender lens unit to the camera apparatus 200 when an inquiry from the camera apparatus 200 arrives. The camera apparatus 200 generates the coefficient data interpolated based on the optical parameters relating to zooming, focusing, the stop, and the extender lens unit to calculate the light amount correction amount, and applies the calculated correction amount to light amount correction processing.

The transmission of the coefficient data for appropriate light amount correction to the camera apparatus and speedy light amount correction throughout the entire image plane from the center of the image plane to the periphery of the image plane are accomplished by setting the elements in the manner described above.

It is preferred that the following conditional expression (5) be satisfied:

$$0.7<A_{0E}/(A_{00}\times B^2)<1.3 \quad (5),$$

where $A_{0E}$ represents a constant term of correction data for the optical parameters (the optical parameter Z relating to zooming, the optical parameter O relating to focusing, and the optical parameter P for the stop) when at least one extender lens unit is inserted into an optical path, $A_{00}$ represents a constant term of correction data for the optical parameters when no extender lens unit is inserted into the optical path, and B represents a focal length changing magnification of the extender lens unit.

A drop in light amount that is optically caused by a switch between the insertion of the extender lens unit into an optical path and the removal of the extender lens unit from the optical path can be corrected by satisfying the conditional expression (5). On the other hand, the effect of noise due to gain-up is greater when the conditional expression (5) is satisfied. It is therefore preferred that an appropriate value within a range in which the conditional expression (5) is satisfied be set based on the frequency of switching between the insertion of the extender lens unit into an optical path and the removal of the extender lens unit from the optical path, and on image pickup conditions.

It is further preferred that a unit configured to allow setting of any correction coefficient (a user interface device) be included, so that the correction amount can be adjusted at discretion by multiplying all terms in the n-th order expression, including the constant term, by the set correction coefficient. This enables a user to change the correction amount at the user's discretion when the user feels that the effect of noise due to gain-up is large. In the case of an interchangeable lens high in the degree of F drop, for example, noise can be lessened by reducing the correction amount on the telephoto side. The unit also allows discretionary correction in which the correction amount is approximately halved in order to address an increase in noise caused by correction that satisfies the conditional expression (5).

It is further preferred that the following conditional expression (6) be satisfied:

$$-0.1<A_2+6\times A_3<0.3 \quad (6),$$

where $A_3$ and $A_2$ represent the third-order coefficient and the second-order coefficient, respectively, of the third-order expression (2) with respect to the image height "h" and which expresses the light amount correction amount D.

When an upper limit of the conditional expression (6) is exceeded, or when a lower limit of the conditional expression (6) is not reached, overcorrection or undercorrection of the light amount occurs in the image plane, causing donut-shaped unevenness in light amount.

It is even more preferred that the light amount correction amount be expressed by a fourth-order expression with respect to the image height. In this case, the light amount correction amount D is expressed by the following fourth-order expression:

$$D=A_{4(Z,O,P,i)}h^4+A_{3(Z,O,P,i)}h^3+A_{2(Z,O,P,i)}h^2+A_{1(Z,O,P,i)}h+A_{0(Z,O,P,i)} \quad (7),$$

where "h" represents the image height. As the coefficient data in the zoom state Z, the focus state O, the stop state P, and the extender lens unit state "i", the fourth-order to 0-th-order coefficients $A_{4(Z, O, P, i)}$, $A_{3(Z, O, P, i)}$, $A_{2(Z, O, P, i)}$, $A_{1(Z, O, P, i)}$, $A_{0(Z, O, P, i)}$ with respect to the image height "h" are recorded in the storage 140.

Figure 2A:
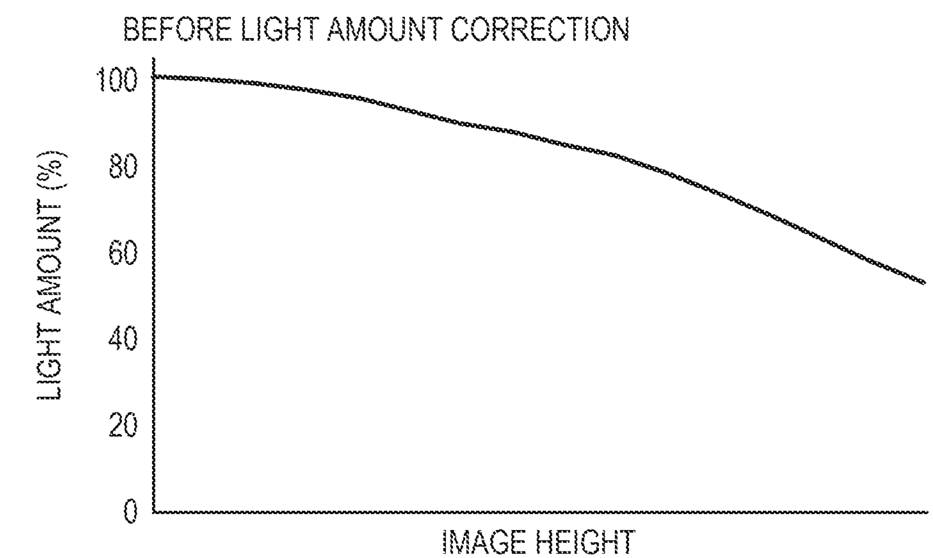
FIG. 2A is a graph for showing effects of light compensation by a third-order expression and a fourth-order expression.
Figure 2B:
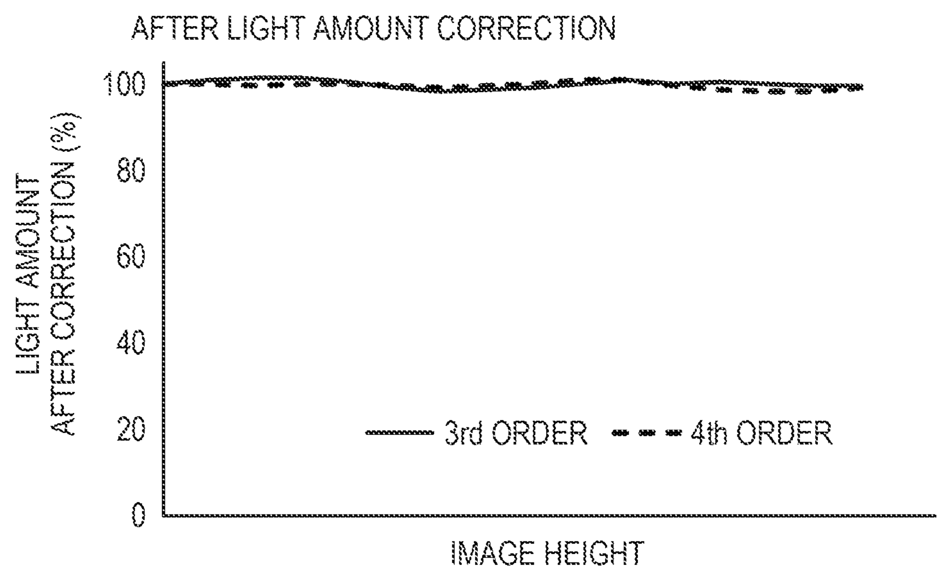
FIG. 2B is a graph for showing the effects of light compensation by the third-order expression and the fourth-order expression.
Figure 2C:
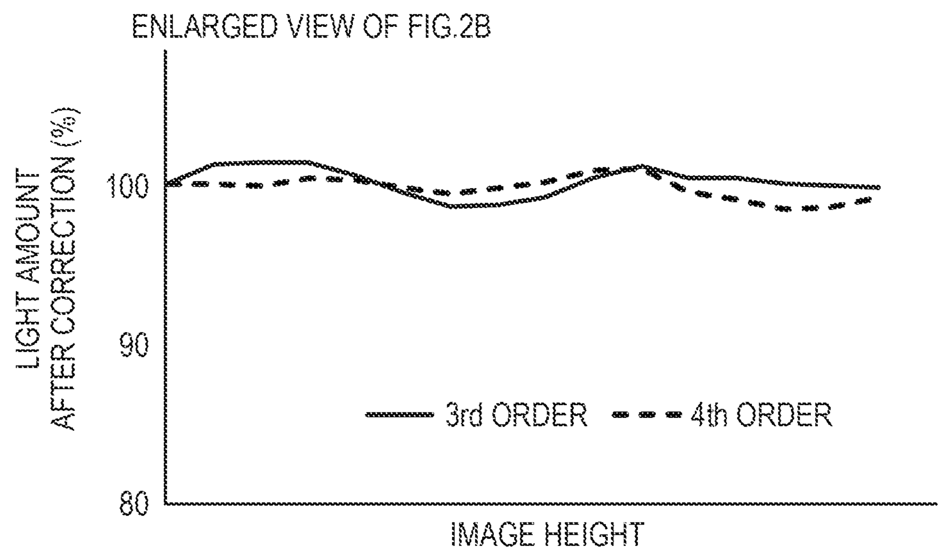
FIG. 2C is a graph for showing the effects of light compensation by the third-order expression and the fourth-order expression.

FIGS. 2A, 2B, and 2C are graphs for showing comparisons of light amounts before and after correction in which the light amount correction amount is expressed by a third-order expression, or a fourth-order expression, with respect to the image height. FIG. 2A is a graph for showing the light amount before correction, with the light amount at the image center as 100%. FIG. 2B is a graph for showing the light amount after correction in which the light amount is corrected by a correction amount that is expressed by a third-order expression with respect to the image height, and the light amount after correction in which the light amount is corrected by a correction amount that is expressed by a fourth-order expression with respect to the image height. FIG. 2C is a graph for showing an enlarged one of a portion of FIG. 2B in which the light amount after correction on the axis of ordinate is 80% to 100%. When the light amount correction amount is expressed by a fourth-order expression with respect to the image height, the amount of correction data communication increases and the amount of calculation for correction accordingly increases. However, the light amount corrected by the fourth-order expression is closer to 100% from the image center to periphery than the light amount corrected by the third-order expression, and correction by the fourth-order expression is therefore preferred.

It is further preferred that the following conditional expression (8) be satisfied:

$$-0.1<A_{3(Z,O,P,i)}+8\times A_{4(Z,O,P,i)}<0.1 \quad (8),$$

where $A_4$ and $A_3$ represent the fourth-order coefficient and the third-order coefficient, respectively, of the fourth-order expression (7) with respect to the image height "h" and which expresses the light amount correction amount D.

When an upper limit of the conditional expression (8) is exceeded, or when a lower limit of the conditional expression (8) is not reached, overcorrection or undercorrection of the light amount occurs in the image plane, causing donut-shaped unevenness in light amount.

It is further preferred that a first lens unit closest to an object out of all lens units be stationary in zooming, and include a focus lens unit. This eases the steepness of a change in light amount in the image height direction that is caused when the optical parameter Z relating to the zoom lens unit, the optical parameter O relating to the focus lens unit, or the optical parameter P relating to the stop changes, and improvement in correction precision is accordingly accomplished with a small number of pieces of data.

It is further preferred that the following conditional expressions (9) and (10) be satisfied:

$$0.7<A_{0(Zw,O,P,i)}/A_{0(Zt\times Fw/Ft,O,P,i)}<1.3 \quad (9);$$

and $$0.7<A_{0((Zw+Zt\times Fw/Ft)/2,O,P,i)}/A_{0(Zt\times Fw/Ft,O,P,i)}<1.3 \quad (10),$$

where Zt represents a zoom parameter of the telephoto end, Zw represents the zoom parameter of the wide angle end, $Ft_{(Zt,\ O,\ P,\ i)}$ represents an effective F-number at the telephoto end, and $Fw_{(Zw,\ O,\ P,\ i)}$ represents the effective F-number at the wide angle end.

In a lens apparatus in which the first lens unit described above is stationary in zooming and includes a focus lens unit, an F-number beam on the telephoto side is assumed to be defined by the lens diameter of the first lens unit. In this case, the light amount can theoretically be corrected with accuracy when the constant term $A_{0(Z,\ O,\ P,\ i)}$ satisfies the following conditional expressions (11) and (12):

$$A_{0(Zw,O,P,i)}=A_{0(zt\times Fw/Ft,O,P,i)} \quad (11);$$

and $$A_{0((Zw+Zt\times Fw/Ft)/2,O,P,i)}=A_{0(Zt\times Fw/Ft,O,P,i)} \quad (12).$$

Figure 3:
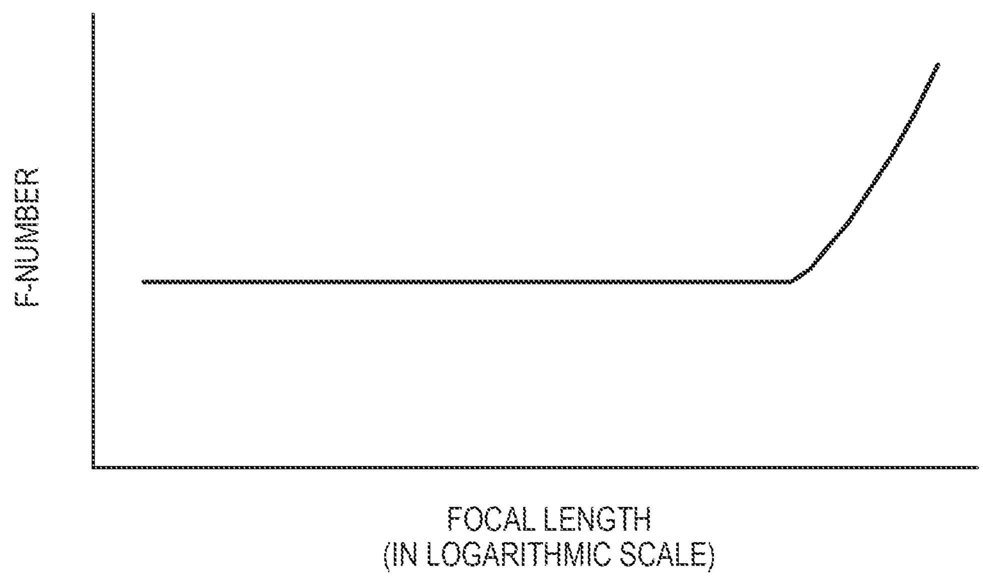
FIG. 3 is a graph for showing changes in F-number that are caused by zooming.

FIG. 3 is a graph for showing changes in F-number in the lens apparatus that has the characteristics described above. In a lens apparatus in which the first lens unit is configured not to be moved for zooming and the F-number beam on the telephoto side is defined by the lens diameter of the first lens unit, the F-number is constant for a given focal distance from the wide angle end toward the telephoto end as shown in FIG. 3. The lens apparatus therefore satisfies conditional expressions (11) and (12).

However, in a situation in which the user conducts a final check, the correction is affected by, among others, the characteristics of the image pickup element, processing of the camera apparatus, and processing executed after a signal is transmitted from the camera apparatus. In addition, it is not always favorable for $A_{0(Z,\ O,\ P,\ i)}$ to satisfy the expressions (11) and (12) in consideration of the interpolation processing when the amount of data used in correction is limited due to restrictions on communication or the capacity of a recording apparatus.

It is therefore preferred that $A_{0(Z,\ O,\ P,\ i)}$ be set appropriately within the range of the conditional expressions (9) and (10).

It is further preferred that the lens apparatus 100 include a parameter transmission device dedicated to the transmission of the optical parameters relating to focusing, zooming, the iris, and the extender lens unit. This allows the camera apparatus 200 to communicate only the optical parameters required for light amount correction, thereby lightening the communication load, and accordingly helps to execute image processing for light amount correction under a condition that any delay is less liable to occur.

It is further preferred that whether to transmit correction data from the transmission device to the camera apparatus be switchable.

This enables the user to set whether correction is to be made depending on use.

It is further preferred to set the numerical ranges of the conditional expressions (6) to (9) as follows.

$$-0.1<A_{2(Z,O,P,i)}+6\times A_{3(Z,O,P,i)}<0.3 \quad (6a);$$

$$-0.1<A_{3(Z,O,P,i)}+8\times A_{4(Z,O,P,i)}<0.1 \quad (8a);$$

$$0.9<A_{0(Zw,O,P,i)}/A_{0(Zt\times Fw/Ft,O,P,i)}<1.1 \quad (9a);$$

and $$0.9<A_{0((Zw+Zt\times Fw/Ft)/2,O,P,i)}/A_{0(Zt\times Fw/Ft,O,P,i)}<1.1 \quad (10a)$$

Figure 4:
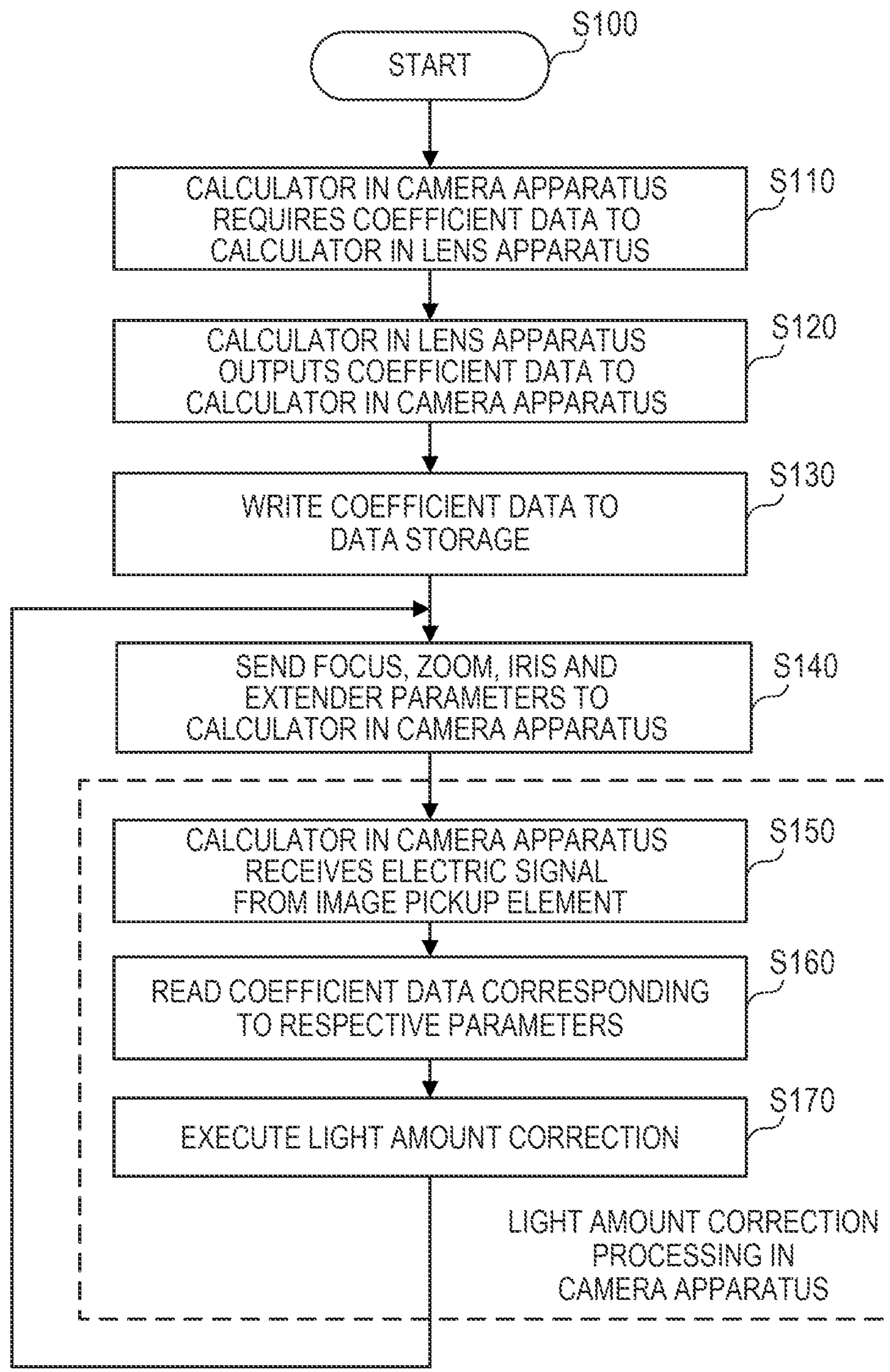
FIG. 4 is a flow chart for illustrating control of light amount compensation processing of the image pickup apparatus according to the first embodiment.

FIG. 4 is a flow chart of light amount correction processing according to the first embodiment.

The light amount correction processing starts with Step S100.

First, the calculator 210 in the camera apparatus requests coefficient data for light amount correction (information for light amount compensation of image data) from the calculator 110 in the lens apparatus via the camera communication device 220 and the lens communication device 120 (Step S110).

The calculator 110 in the lens apparatus reads the coefficient data for light amount correction out of the storage 140. The calculator 110 in the lens apparatus then outputs the coefficient data for light amount correction to the calculator 210 in the camera apparatus via the lens communication device 120 and the camera communication device 220 (Step S120).

The calculator 210 in the camera apparatus writes the received coefficient data for light amount correction to the data storage 240 (Step S130).

Next, the calculator 110 in the lens apparatus obtains parameters from the focus obtaining device 101, the zoom obtaining device 102, the iris obtaining device 103, and the extender obtaining device 104. The calculator 110 in the lens apparatus then outputs the parameters (information regarding one of a plurality of combinations of the zoom lens unit state, the focus lens unit state, and the aperture stop state at each point in time) to the calculator 210 in the camera apparatus via the lens communication device 120 and the camera communication device 220 (Step S140).

The subsequent steps, namely, Step S150 to Step S170, are light amount correction processing performed in the camera apparatus on image data of a photographed image.

The calculator 210 in the camera apparatus receives an electric signal of an image from the image pickup element 250 (Step S150).

The calculator 210 in the camera apparatus reads, out of the data storage 240, a piece of coefficient data for light amount correction that corresponds to the parameters received in Step S140, in order to execute light amount correction (Step S160). Correction data stored in the data storage 240 is coefficient data at a plurality of representative points for focusing, for zooming, and for the iris.

Accordingly, once the focus state, the zoom state, and the iris state are identified, the calculator 210 in the camera apparatus derives a piece of coefficient data that is associated with the identified states, based on the coefficient data at a plurality representative points required for an interpolation method to be executed.

The calculator 210 in the camera apparatus executes light amount correction (Step S170).

Returning to Step S140 to execute the light amount correction processing for the next frame, and the processing flow is continued.

Second Embodiment

Figure 5:
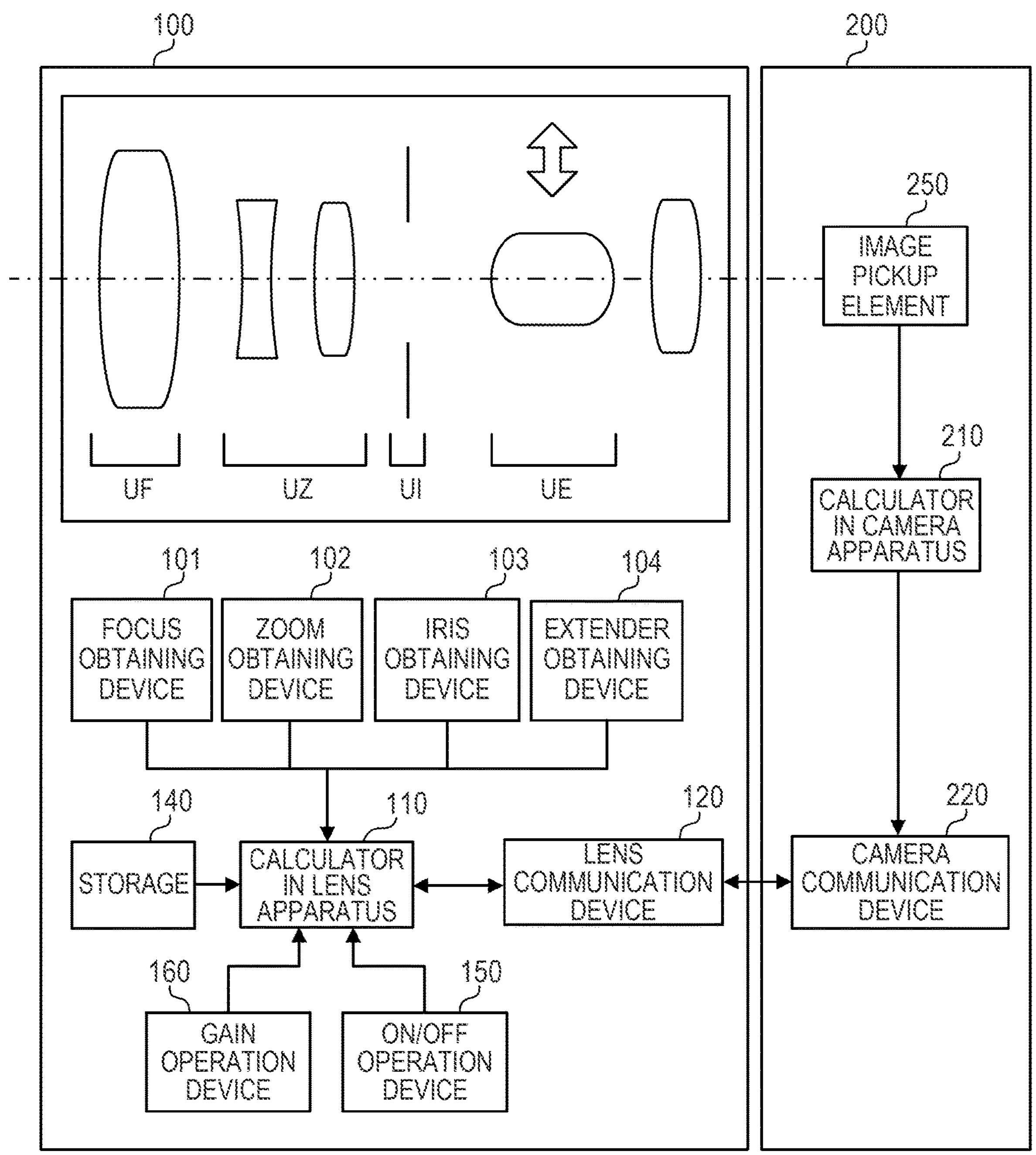
FIG. 5 is a block diagram of an image pickup apparatus according to a second embodiment of the present invention.

FIG. 5 is a block diagram of a lens apparatus 100 and camera apparatus 200 according to a second embodiment of the present invention.

The second embodiment differs from the configuration of the first embodiment described with reference to FIG. 1 in that the extender lens unit UE includes two types of extender lens units, which can selectively be inserted into or removed from an optical path, to be switched between states including a state in which no extender lens unit is inserted into the optical path. Another difference is that the configuration in the second embodiment includes an on/off operation device 150 configured to switch on/off of the transmission of light amount correction data, and a gain operation device 160 configured to allow discretionary setting of overall gain.

The light amount correction amount is expressed by a third-order expression (the expression (2)), or a fourth-order expression (the expression (7)), with respect to the image height as in the first embodiment. All coefficients of the third-order expression (the expression (2)) or the fourth-order expression (the expression (7)) are multiplied by a correction coefficient, and results of the multiplication are used as coefficients of a polynomial for calculating the light amount correction amount when the gain is to be set at discretion by the gain operation device 160.

Unlike the first embodiment, the camera apparatus 200 of the second embodiment includes no recording device to store a table for correction data, because coefficient data adapted for a parameter relating to focusing, a parameter relating to zooming, a parameter relating to the iris, and a parameter relating to the extender lens unit is transmitted to the camera apparatus.

It is preferred that the following conditional expression (13) be satisfied:

$$0.7<A_{0i}/(A_{00}\times B^2)<1.3 \quad (13),$$

where $A_{0i}$ represents a constant term of correction data for the optical parameters (the optical parameter A relating to zooming, the optical parameter O relating to focusing, and the optical parameter P for the stop) when an i-th extender lens unit is inserted into an optical path, $A_{00}$ represents a constant term of correction data for the optical parameters Z, O, and P when no extender lens unit is inserted into the optical path, and B represents a focal length changing magnification of the i-th extender lens unit.

A drop in light amount that is optically caused by a switch between the extender lens units can be corrected by satisfying the conditional expression (13). On the other hand, the effect of noise due to gain-up is greater when the conditional expression (13) is satisfied. It is therefore preferred that an appropriate value be set based on the frequency of switching between the extender lens units, and on image pickup conditions.

Figure 6:
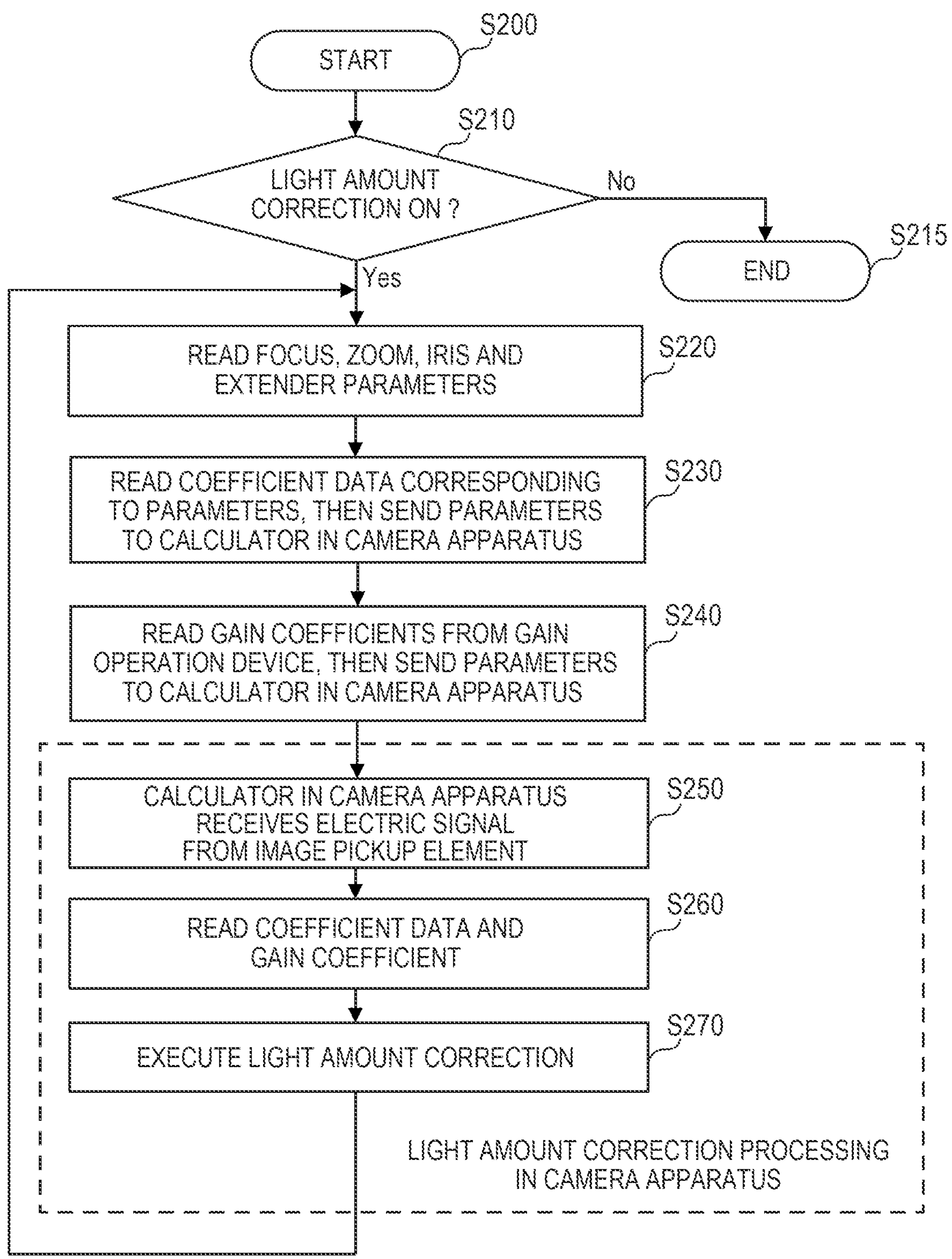
FIG. 6 is a flow chart for illustrating control of light amount compensation processing of the image pickup apparatus according to the second embodiment.

FIG. 6 is a flow chart for illustrating light amount correction processing in the second embodiment. The processing starts with Step S200.

First, the settings of the on/off operation device 150 are checked. Step S220 and subsequent steps of the light amount correction processing are executed when the settings are "on". When the settings are "off", the processing proceeds to Step S215 to be ended.

Next, the calculator 110 in the lens apparatus obtains parameters from the focus obtaining device 101, the zoom obtaining device 102, the iris obtaining device 103, and the extender obtaining device 104 (Step S220).

The calculator 110 in the lens apparatus next reads out a piece of coefficient data for light amount correction that is adapted for the parameters from the storage 140. The calculator 110 in the lens apparatus then transmits the piece of coefficient data for light amount correction to the calculator 210 in the camera apparatus via the lens communication device 120 and the camera communication device 220 (Step S230). Correction data stored in the storage 140 is coefficient data at a plurality of representative points for focusing, for zooming, and for the iris. Accordingly, once the focus state, the zoom state, and the iris state are identified, the calculator 110 in the lens apparatus derives a piece of coefficient data that is associated with the identified states, based on the coefficient data at a plurality representative points required for an interpolation method to be executed.

The calculator 110 in the lens apparatus next reads a gain coefficient corresponding to an increase/reduction in gain out of the gain operation device 160, and transmits the coefficient data for light amount correction to the calculator 210 in the camera apparatus via the lens communication device 120 and the camera communication device 220 (Step S240).

The subsequent steps are steps of light amount correction processing inside the camera apparatus 200.

The calculator 210 in the camera apparatus receives an electric signal of an image from the image pickup element 250 (Step S250).

The calculator 210 in the camera apparatus obtains the coefficient data for light amount correction and the gain coefficient via the lens communication device 120 and the camera communication device 220 (Step S260).

The calculator 210 in the camera apparatus obtains a correction amount with the use of correction coefficients multiplied by the gain coefficient, and corrects the light amount of an image signal with the obtained correction amount (Step S270). Returning to Step S220 to execute the light amount correction processing for the next frame, and the flow is continued.

In the second embodiment, the on/off operation device 150 of the lens apparatus 100 switches on/off of the transmission of coefficient data. However, the present invention is not limited thereto, and the same effect is obtained also when the calculator 210 in the camera apparatus is configured to handle the switching of execution/non-execution of light amount correction processing.

Third Embodiment

Figure 7:
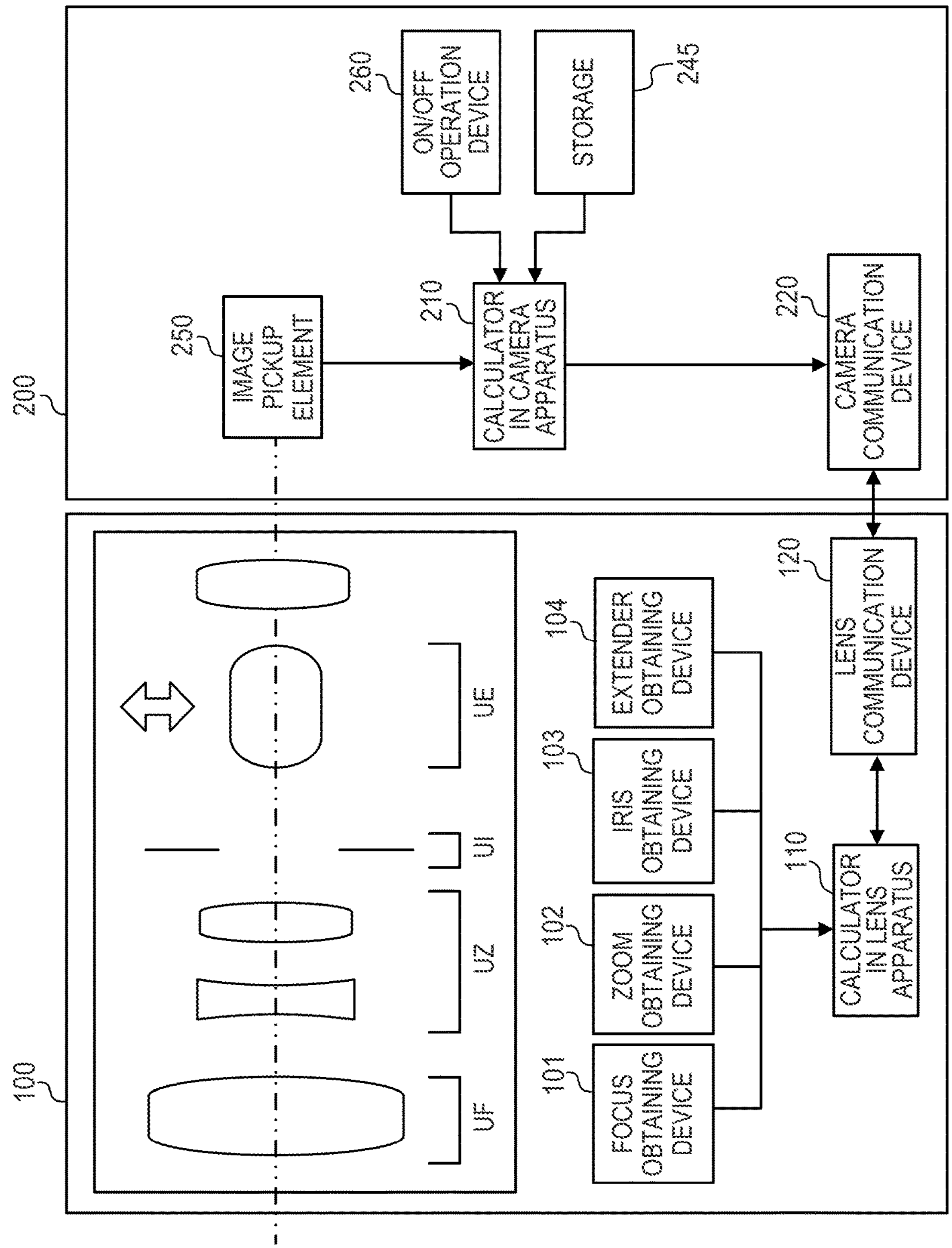
FIG. 7 is a block diagram of an image pickup apparatus according to a third embodiment of the present invention.

FIG. 7 is a block diagram of a lens apparatus 100 and camera apparatus 200 according to a third embodiment of the present invention.

The configuration of the third embodiment differs from the first embodiment in that the lens apparatus 100 does not include the storage 140 to store light amount coefficient data, whereas the camera apparatus 200 includes a storage 245, and that an on/off operation device 260 configured to switch on/off of light amount correction processing is included.

The on/off operation device 260 in the third embodiment switches on/off of light amount correction processing. The on/off operation device 260 may switch on/off of communication to and from the lens apparatus because the obtained effect is the same.

The difference from the first embodiment resides in that the camera apparatus stores the coefficient data and performs light amount correction. Specifically, only optical parameters are communicated between the lens apparatus 100 and the camera apparatus 200 in the third embodiment.

This lightens the communication load and makes it easy to deal with high-speed processing.

The rest of the configuration and effects in the third embodiment are the same as those described in the first embodiment.

Figure 8:
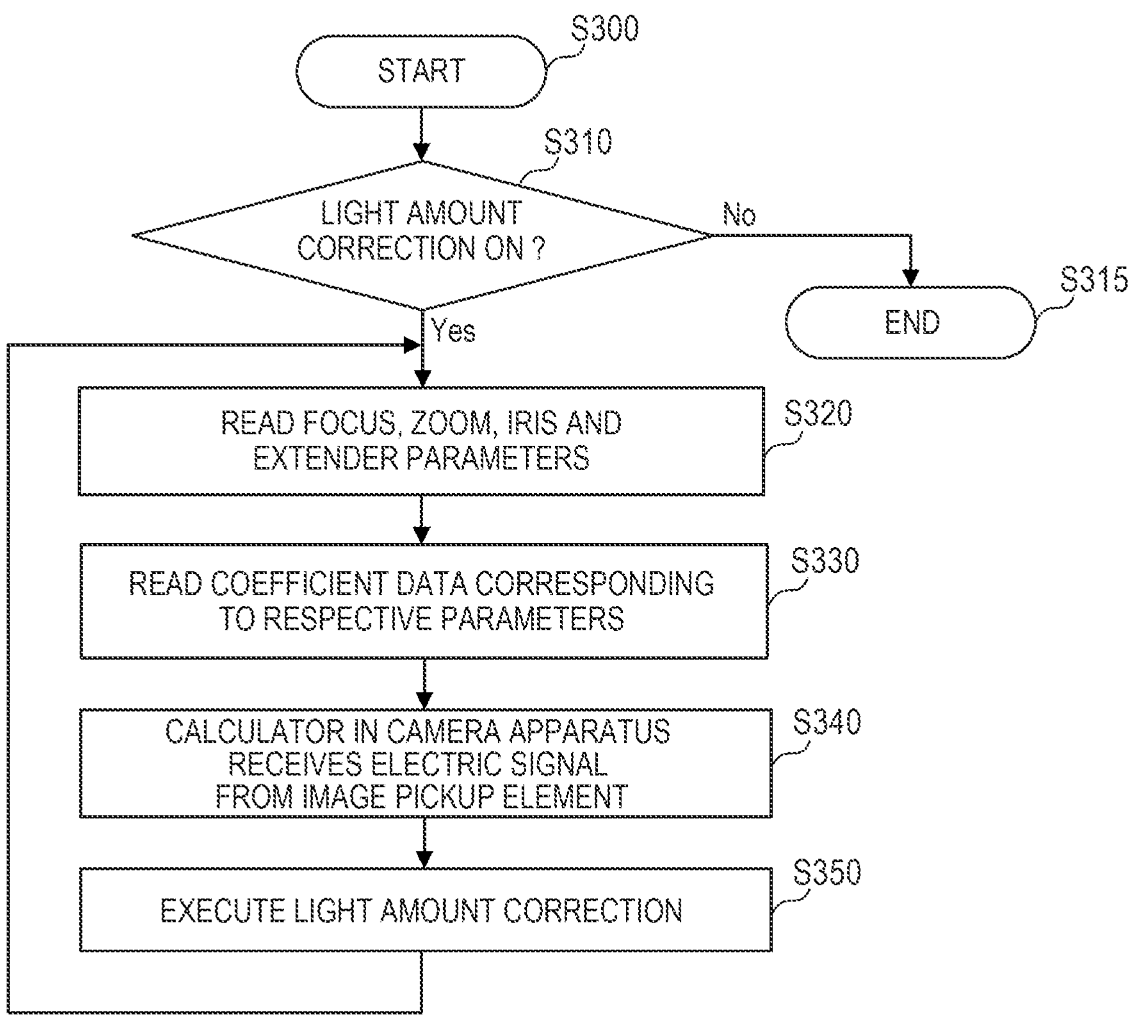
FIG. 8 is a flow chart for illustrating control of light amount compensation processing of the image pickup apparatus according to the third embodiment.
Figure 9:
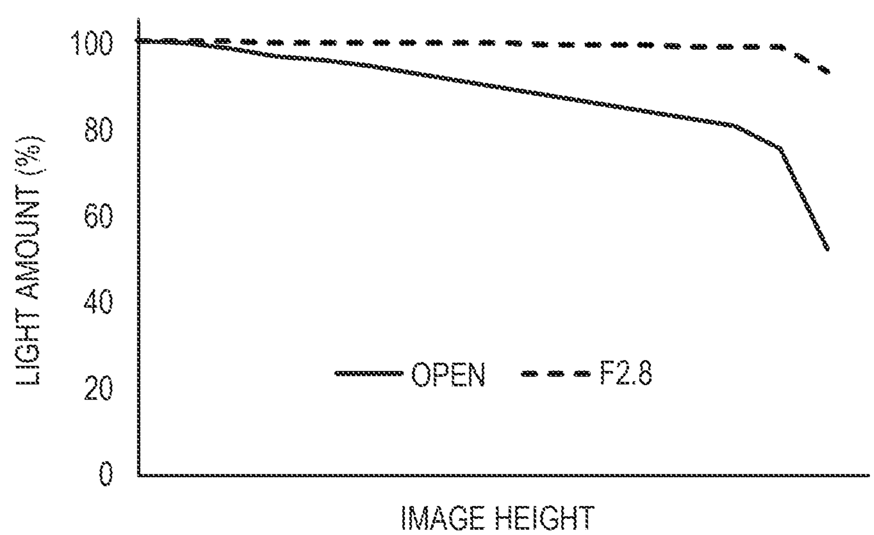
FIG. 9 is a graph for showing the light amount ratio of a peripheral light amount to a central light amount.

FIG. 8 is a flow chart of processing that relates to light amount correction processing in the third embodiment. The processing starts with Step S300.

In Step S310, the calculator 210 in the camera apparatus checks settings of the on/off operation device 260 and, when the settings are "on", proceeds to Step S320 to execute light amount correction processing. When the settings are "off", the calculator 210 in the camera apparatus proceeds to Step S315 to end the processing.

In Step S320, the calculator 210 in the camera apparatus receives, from the lens apparatus 100, via the camera communication device 220, parameters obtained by the focus obtaining device 101, the zoom obtaining device 102, the iris obtaining device 103, and the extender obtaining device 104. The processing then proceeds to Step S330.

In Step S330, the calculator 210 in the camera apparatus reads, out of the storage 245, a piece of coefficient data for light amount correction that corresponds to the parameters received in order to correct the light amount. The processing then proceeds to Step S340. Correction data stored in the storage 245 is coefficient data at a plurality of representative points for focusing, for zooming, and for the iris. Accordingly, once the focus state, the zoom state, the iris state, and the extender state are identified, the calculator 210 in the camera apparatus derives a piece of coefficient data that is associated with the identified states, based on the coefficient data at a plurality representative points required for an interpolation method to be executed.

In Step S340, the calculator 210 in the camera apparatus receives an electric signal of an image from the pickup element 250. The processing then proceeds to Step S350. In Step S350, the calculator 210 in the camera apparatus performs light amount correction, and the processing then returns to Step S320 where the calculator 210 in the camera apparatus executes the light amount correction processing for the next frame.

As in the example of the third embodiment, which is exemplification, satisfactory light amount correction is accomplished at each image height from the central image height to the peripheral image height with a small amount of data, by performing light amount correction based on the coefficient of each order of the light amount correction amount that is approximated by an n-th-order polynomial with respect to the image height. The apparatus above, however, may have a processing mode in which only the 0-th-order coefficient (constant term) is provided for light amount correction processing out of the coefficients of the respective orders of the light amount correction amount that is approximated by an n-th-order polynomial with respect to the image height. This processing mode can similarly provide a sufficient light amount correction effect, depending on conditions under which the picked up image is used, for example, when the main purpose is to correct a drop in light amount due to F drop on the telephoto side. Light amount correction for that purpose uses only correction data that is independent of the image height and is dependent on the states of the zoom lens, the focus lens, the stop, and the extender lens unit. In that case, the 0-th-order coefficient (constant term) alone may be transmitted as required correction data from the lens apparatus to the camera apparatus, or a processing unit configured to execute light amount correction processing may take only the 0-th-order coefficient (constant term) into consideration in executing the light amount correction processing.

In the example of the embodiments, image data converted by photoelectric conversion in the image pickup element of the camera apparatus is corrected in the camera apparatus that has an image processing function (an image processing apparatus), based on data for light amount correction in an optical correction table. However, the present invention is not limited thereto. An external device (image processing device) receiving image data from the camera apparatus and receiving data for light amount correction from the lens apparatus may execute the light amount correction processing.

The camera apparatus cannot correct (compensate for) a drop in peripheral light amount until after a huge amount of data required for the correction is transmitted from the lens apparatus to the camera apparatus. However, the transmission of all pieces of data from the lens apparatus to the camera apparatus may not always be successful depending on the type of the camera apparatus, due to restrictions on the storage capacity of the memory, restrictions on an activation time counted from the mounting of the lens apparatus, restrictions on the performance of the correction processing, or other factors. In such a case, the camera apparatus may completely be incapable of executing light amount correction (light amount compensation). The following embodiments are aimed to provide, for example, a lens apparatus advantageous for light amount compensation processing in various camera apparatus.

According to the following embodiments, a lens apparatus advantageous for light amount compensation processing in various camera apparatus can be provided.

Other embodiments of the present invention are described below with reference to the accompanying drawings. Throughout the drawings referred to in the description of the embodiments, in principle, the same members are denoted by the same symbols (unless otherwise stated), and repetitive descriptions of the members are omitted.

Fourth Embodiment

Figure 10:
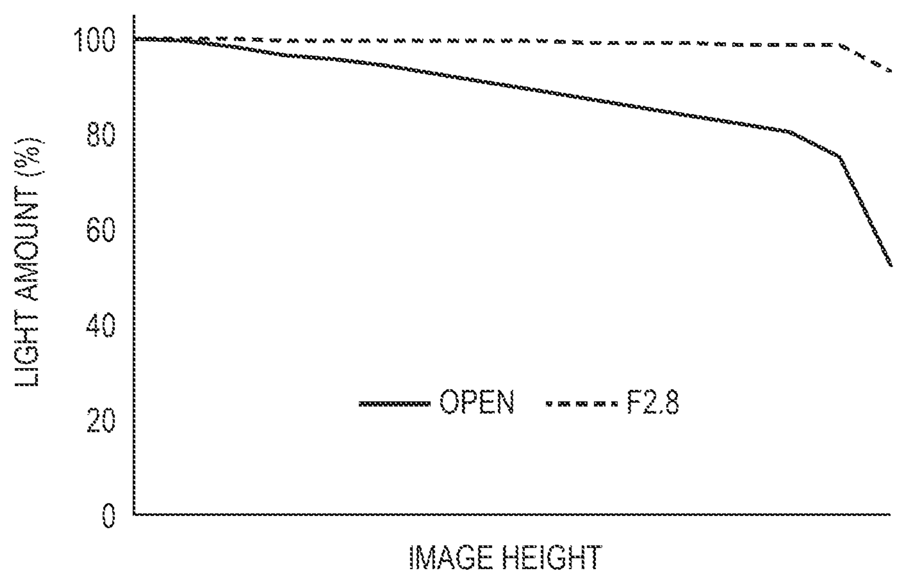
FIG. 10 is a graph for showing exemplification of a drop in peripheral light amount.
Figure 11:
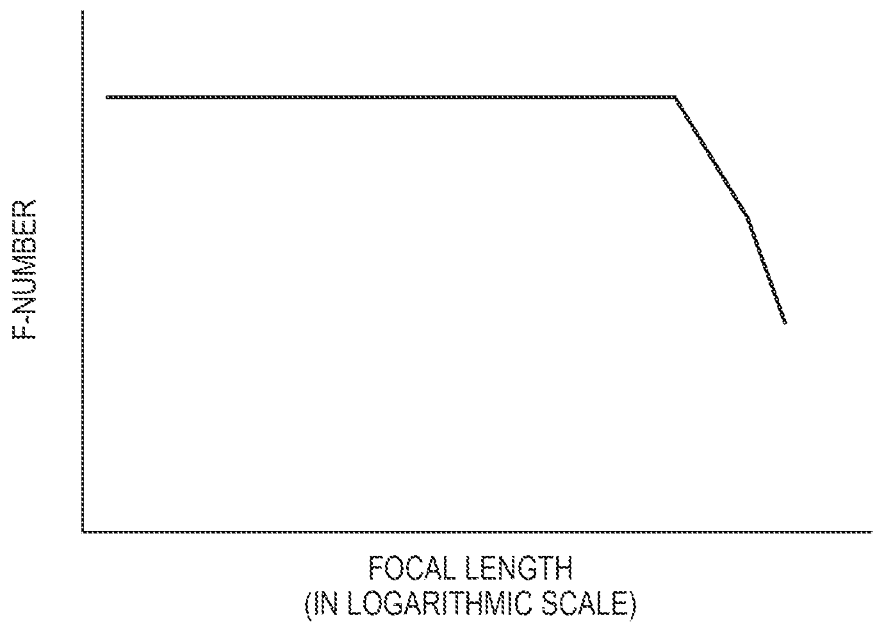
FIG. 11 is a graph for showing exemplification of F drop.
Figure 12:
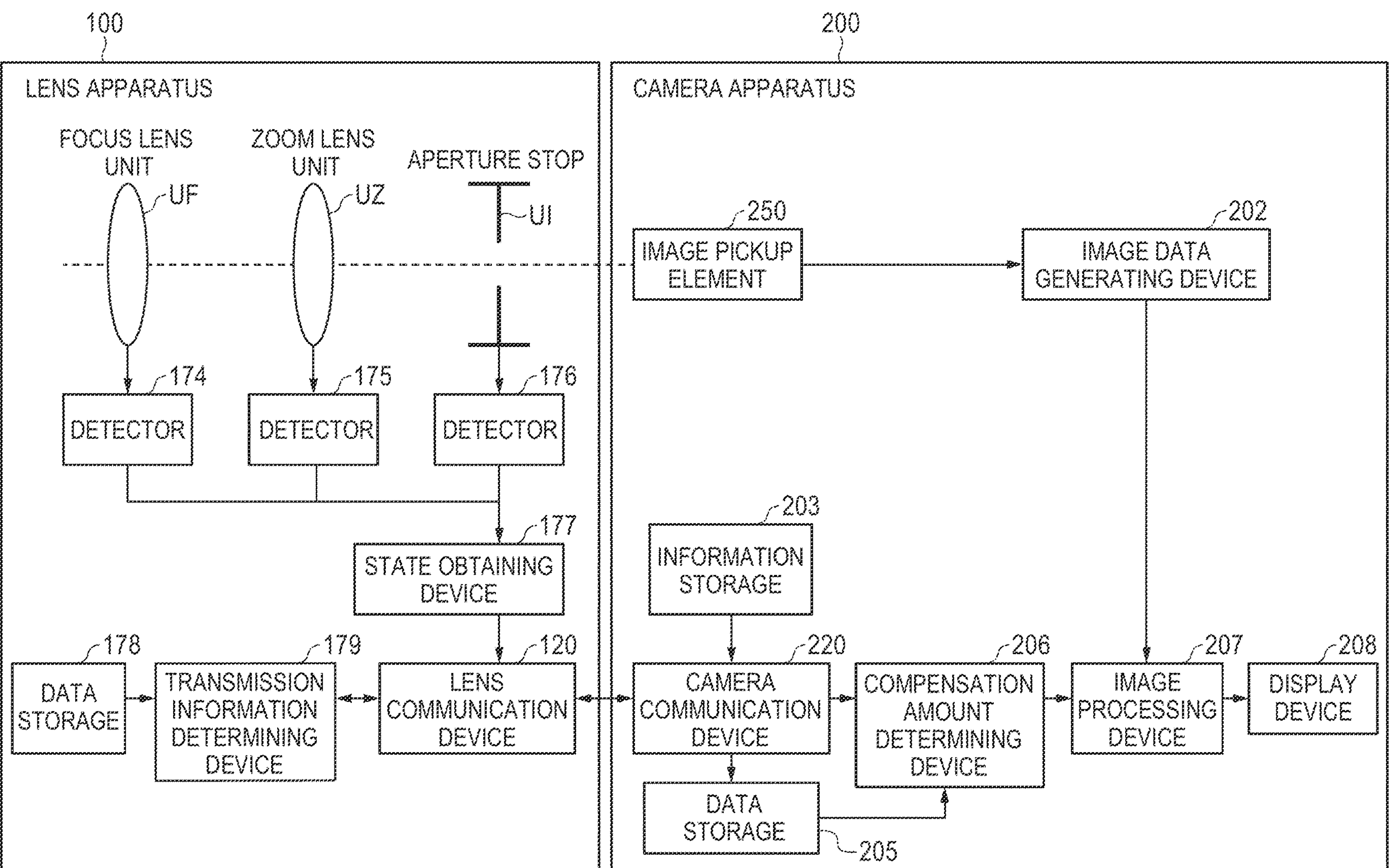
FIG. 12 is a diagram for illustrating a configuration example of a fourth embodiment of the present invention.

FIG. 10 is a graph for showing exemplification of a drop in peripheral light amount. An example of drops in peripheral light amount that are observed when the aperture stop is opened to full aperture (at F1.8) and at F2.8 is shown in FIG. 10, and indicates that the degree of drop in peripheral light amount is reduced by stopping down by the aperture stop. FIG. 11 is a graph for showing exemplification of F drop. FIG. 12 is a diagram for illustrating a configuration example of a fourth embodiment of the present invention. In FIG. 12, a lens apparatus 100 includes a movable optical member that is moved to change photographing conditions. A camera apparatus (an image pickup apparatus main body) 200 includes an image pickup element placed on an image plane of the lens apparatus, with the lens apparatus 100 mounted on the camera apparatus 200. The lens apparatus 100 is removably mounted on the camera apparatus 200.

A focus lens unit UF is a movable optical member that is moved for focusing. A zoom lens unit UZ is a movable optical member that is moved for zooming. An aperture stop (also referred to as "iris unit") UI is a movable optical member that is moved to adjust the light amount. A detector 174 (also referred to as "first detector") is configured to detect the state (position) of the focus lens unit. A detector 175 (also referred to as "second detector") is configured to detect the state (position) of the zoom lens unit. A detector 176 (also referred to as "third detector") is configured to detect the state (the degree of aperture) of the aperture stop. The detectors 174 to 176 may each include, for example, an encoder (e.g., absolute encoder).

A state obtaining device 177 is configured to obtain the state of the lens apparatus 100 (also referred to as "photographing conditions") based on the output of the detector 174, the output of the detector 175, and the output of the detector 176. The state obtaining device 177 obtains the state of the lens apparatus 100 as, for example, the state of the focus lens unit that is normalized within a range of possible states, the state of the zoom lens unit that is normalized within a range of possible states, and the state of the aperture stop that is normalized within a range of possible states. The normalized state of the focus lens unit may be expressed by, for example, a value equal to or larger than 0 and equal to or smaller than 9,999 when one end of the range is 0 and the other end of the range is 9,999. The same applies to the other movable optical members as well. The movable optical members are not limited to the ones described above. For instance, the optical members may include a conversion lens unit (an extender lens unit or a similar focal length conversion lens unit) insertable into and removable from an optical path. The optical members may also include, for example, a movable lens unit for flange back adjustment, and a movable lens unit for macro photography (closeup photography, or intentional defocusing as a visual effect). Other optical members to be considered in light amount compensation processing of image data that is obtained by image pickup in the camera apparatus may also be included. When the other members to be considered are included, the state of the lens apparatus 100 (photographing conditions) is obtained based also on the states of the other optical members to be considered. A data storage 178 is configured to store data required for the light amount compensation processing (light amount compensation data), and may include, for example, a FLASH ROM or a similar non-volatile memory. The light amount compensation data is data unique to optical characteristics of the lens apparatus 100.

A transmission information determining device 179 is configured to determine information of the light amount compensation data to be transmitted to the camera apparatus 200, based on information about the camera apparatus 200. A communication device 120 is configured to hold communication to and from the camera apparatus 200. The information of the light amount compensation data determined by the transmission information determining device 179 includes information about coefficients of an n-th-order polynomial (also referred to as "n-th-order expression") with respect to the image height. The coefficients are functions that indicate the state of the lens apparatus 100 described above. For instance, the coefficients may be three-dimensional array (in a general form, M-dimensional array: M is an integer equal to or larger than 1, and represents the number of states depending on which the coefficients vary) data that varies depending on the state of the focus lens unit, the state of the zoom lens unit, and the state of the aperture stop. The information of the light amount compensation data determined by the transmission information determining device 179 is transmitted to the camera apparatus via the lens communication unit 120. The 0-th-order term with respect to the image height in the n-th-order expression is a term independent of the image height, and a coefficient of the 0-th order term is accordingly used as light amount compensation data relating to F drop. The n-th-order polynomial, when n is 4, is expressed by the following expression (1):

$$A_4h^4+A_3h^3+A_2h^2+A_1h+A_0 \quad (1),$$

where h represents the image height.

The data storage 178 stores data of the coefficients $A_4$, $A_3$, $A_2$, $A_1$, and $A_0$ as the light amount compensation data. The coefficients may be M-dimensional array data as described above. FIG. 15 is a diagram for illustrating a configuration example of the light amount compensation data. In FIG. 15, the light amount compensation data includes division number data, division point data, and coefficient data. The division number data includes focus state division number data, the zoom state division number data, and the aperture stop state division number data. The focus state division number data is data indicating how many sections the range of possible focus states is to be divided into. The zoom state division number data is data indicating how many sections the range of possible zoom states is to be divided into. The aperture stop state division number data is data indicating how many sections the range of possible aperture stop states is to be divided into. The division point data includes focus state division point data, zoom state division point data, and aperture stop state division point data. The focus state division point data is data indicating, for each of the plurality of sections of the focus state range, the focus state of the section. The zoom state division point data is data indicating, for each of the plurality of sections of the zoom state range, the zoom state of the section. The aperture stop state division point data is data indicating, for each of the plurality of sections of the aperture stop state range, the aperture stop state of the section. The coefficient data includes data of coefficients of the 0-th-order to n-th-order terms in the n-th-order polynomial for each combination of a focus state division point, a zoom state division point, and an aperture stop state division point. When the focus state division number data is Fnum, the number of focus state division points is Fnum. When the zoom state division number data is Znum, the number of zoom state division points is Znum. When the aperture state division number data is Inum, the number of aperture state division points is Inum. The n-th-order polynomial relating to the coefficient data may be, for example, the fourth-order polynomial of the expression (1). The value of n is not limited to 4, and is an integer equal to or larger than 1. It is preferred that n be an integer equal to or larger than 3.

The number of pieces of coefficient data is (n+1)×Fnum×Znum×Inum where Fnum represents the focus state division number, Znum represents the zoom state division number, Inum represents the aperture stop state division number, and n represents the maximum degree of the polynomial. The n-th-order polynomial is expressed by the following expression (2):

$$A_n h^n + \ldots A_3 h^3 + A_2 h^2 + A_1 h + A_0 \quad (2).$$

The state obtaining device 177, the data storage 178, the transmission information determining device 179, and the lens communication device 120 form a processing device. The processing device may include a single processor (CPU or the like) or a plurality of processors.

The camera apparatus 200 is described next. In the camera apparatus 200, an image pickup element 250 is placed on an image plane of the lens apparatus 100, with the lens apparatus 100 mounted on the camera apparatus. The image pickup element 250 is for obtaining (receiving light of or picking up) an (optical) image that is formed by the lens apparatus, and may be, for example, a CMOS image sensor. An image data generating device 202 is configured to generate image data (still image data or moving image data) based on an image signal that is obtained by the image pickup element 250. An information storage 203 is configured to store information about the camera apparatus. A communication device 220 is configured to hold communication to and from (the lens communication device 120 of) the lens apparatus 100. A data storage 205 is configured to store the light amount compensation data transmitted from the lens apparatus 100, and may include, for example, a FLASH ROM or a similar non-volatile memory. The information stored in the information storage 203 is a storage capacity (data size) available for the storage of the light amount compensation data in the data storage 205, the image size of the image pickup element 250, a tolerance (upper limit value) for the time required by the camera apparatus to receive the light amount compensation data, and other pieces of information. The stored information may be information about resources of the camera apparatus 200 that are to be used for light amount compensation (processing). The stored information is not limited to the pieces of information given above as an example, and may be information useful to the lens apparatus 100 in identifying (limiting) transmission information that relates to the light compensation data to be transmitted by the lens apparatus to the camera apparatus. A compensation amount determining device 206 is configured to determine a compensation amount (correction amount) by which the image data generated by the image data generating device 202 is to be compensated, based on the light amount compensation data stored in the data storage and on the state of the lens apparatus 100 (photographing conditions). An image processing device 207 is configured to perform image processing (processing for light amount compensation) on the image data generated by the image data generating device 202, based on the compensation amount determined by the compensation amount determining device 206. The image data generating device 202, the information storage 203, the camera communication device 220, the data storage 205, the compensation amount determining device 206, and the image processing device 207 form a processing device. The processing device may include, for example, a single processor (CPU or the like) or a plurality of processors. A display device 208 is configured to display an image (moving image) based on the image data obtained by the image processing device, and may be, for example, a liquid crystal display device.

In the fourth embodiment, the flow from the incidence of light on the lens apparatus 100 from an object to the display of the light as image data compensated in light amount is as described below. The light incident on the lens apparatus 100 forms an image on the image pickup element 250 via the focus lens unit UF, the zoom lens unit UZ, and the aperture stop UI. The image pickup element 250 converts the formed image into an electric signal. The image data generating device 202 generates image data based on the electric signal, and outputs the image data to the image processing device 207. The image processing device 207 performs image processing on the image data from the image data generating device 202, based on a compensation amount determined by the compensation amount determining device 206, and outputs the image data after light amount compensation to the display device 208. In this manner, an image compensated for a drop in light amount that is caused by optical characteristics of the lens apparatus 100 is displayed on the display device 208.

Figure 13:
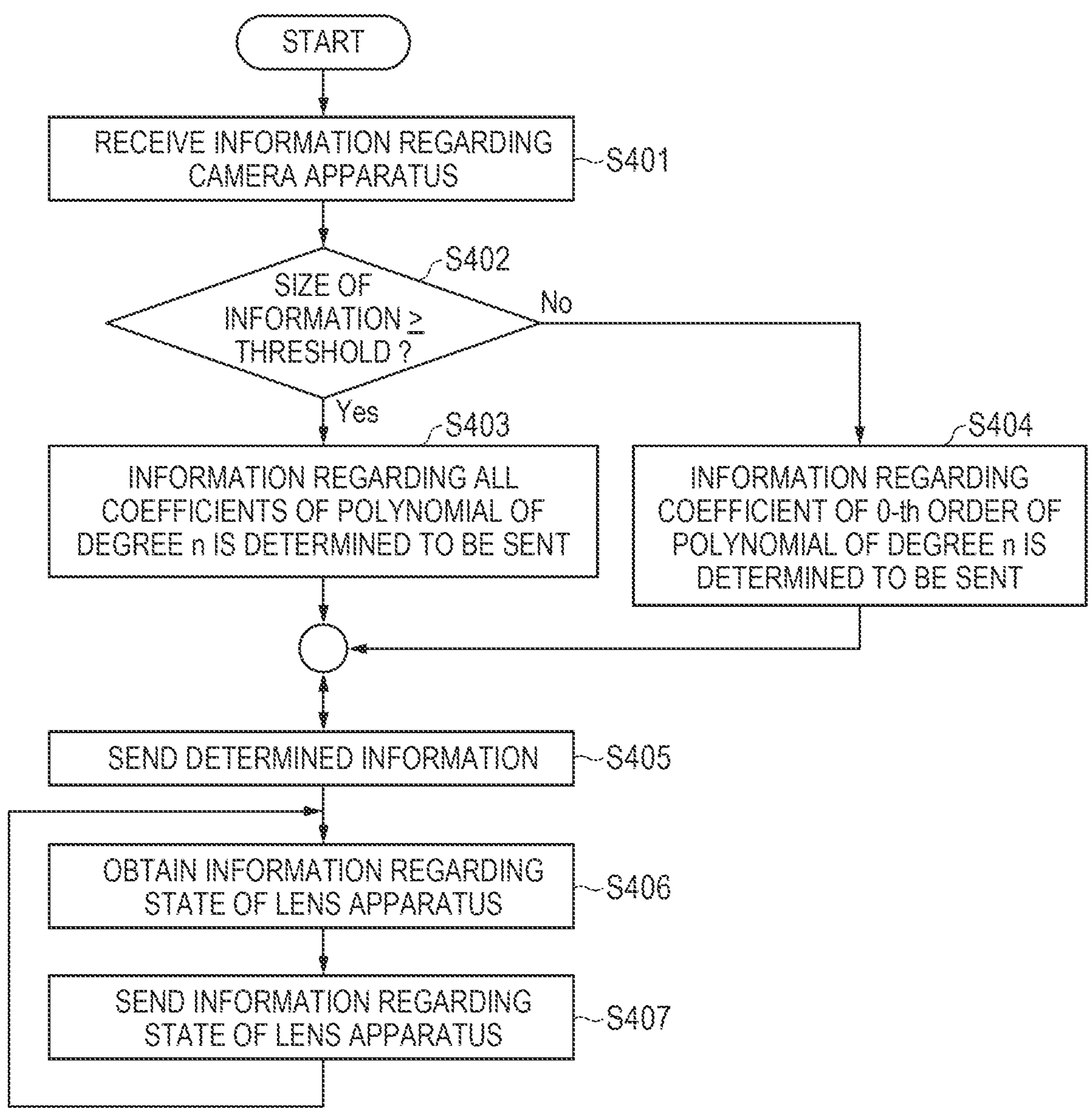
FIG. 13 is a diagram for illustrating an exemplified flow of processing in the fourth embodiment.

FIG. 13 is a diagram for illustrating an exemplified flow of processing in the fourth embodiment. This processing is executed in the lens apparatus 100 and includes the determination of information that relates to the light amount compensation data to be transmitted to the camera apparatus 200. This processing is configured so that light amount compensation is executable even when restriction on the data storage capacity of the camera apparatus 200 (or even when the data storage capacity is extremely small), on which the lens apparatus 100 is mounted, is excessively heavy. In the fourth embodiment, the processing of transmitting the light amount compensation data to the camera apparatus 200 is executed immediately after communication between the lens apparatus 100 and the camera apparatus 200 is established. The light amount compensation processing can therefore be executed right after the transmission of the image data obtained by image pickup.

As the processing of FIG. 13 is started, the lens communication device 120 of the lens apparatus 100 receives, in Step S401, information about the camera apparatus 200 from (the camera communication device 220 of) the camera apparatus 200. The received information here includes information on a data size (storage capacity) available for storage by the data storage 205 of the camera apparatus 200. In subsequent Step S402, the transmission information determining device 179 determines whether or not the data size in the information received in Step S401 is equal to or more than a threshold. The threshold may be the data size of the entire light amount compensation data (all coefficients of the n-th-order polynomial) in the data storage 178 of the lens apparatus. The processing proceeds to Step S403 when the result of the determination is positive ("yes"). The processing proceeds to Step S404 when the result of the determination is negative ("no"). In Step S403, information about all coefficients of the n-th-order polynomial is determined as information to be transmitted to the camera apparatus 200. In Step S404, information about only the 0-th-order coefficient of the n-th-order polynomial is determined as information to be transmitted to the camera apparatus 200.

In subsequent Step S405, the lens communication device 120 of the lens apparatus transmits the information determined in one of Step S403 and Step S404 to (the camera communication device 220 of) the camera apparatus 200. In Step S406, the state obtaining device 177 obtains information about the state of the lens apparatus 100 (photographing conditions), based on a state detected by the detector 174, a state detected by the detector 175, and a state detected by the detector 176. In Step S407, the lens communication device 120 transmits the information obtained in Step S406 about the state of the lens apparatus 100 to (the camera communication device 220 of) the camera apparatus 200. From then on, the processing of Step S406 and the processing of Step S407 are repeatedly executed in order. This enables the camera apparatus 200 to execute the light amount compensation processing of image data based on a piece of light amount compensation data that corresponds to the lens apparatus state (photographing conditions) at, for example, each predetermined cycle (e.g., each image frame cycle). The processing flow described above may be ended when an ending condition determined in advance is fulfilled.

The processing flow described above enables even a camera apparatus small in storage capacity to perform light amount compensation that is based on information of the 0-th-order coefficient (a constant) of the n-th-order polynomial and that is accordingly reduced significantly in the amount of required data (light amount compensation for a drop in light amount that is independent of the image height (what is called F drop)). Cases in which the camera apparatus is completely incapable of executing light amount compensation processing can therefore be reduced. The lens apparatus 100 may be configured so as to transmit the light amount compensation data any time a request (an inquiry) is received from the camera apparatus 200. As described above, the lens apparatus provided according to the fourth embodiment is advantageous for light amount compensation processing in various camera apparatus, for example.

Fifth Embodiment

A fifth embodiment of the present invention is described next. The configuration example in the fourth embodiment illustrated in FIG. 12 may be used as a configuration example in the fifth embodiment. As described in the fourth embodiment, information related to light amount compensation data is transmitted from the lens apparatus 100 to the camera apparatus 200 immediately after communication between the lens apparatus 100 and the camera apparatus 200 is established. Some camera apparatus are required to be ready to photograph (pick up an image) right after being activated (powered on). A camera apparatus of the type has no time to spare for the reception of information on all coefficients of the n-th-order polynomial relating to the light amount compensation data from the lens apparatus. Taking this into consideration, the lens apparatus 100 according to the fifth embodiment transmits information on only the coefficient A0 (a constant) of the 0-th-order term (a constant term) of the n-th-order polynomial to the camera apparatus 200 of that type in order to cut short the transmission time.

Figure 14:
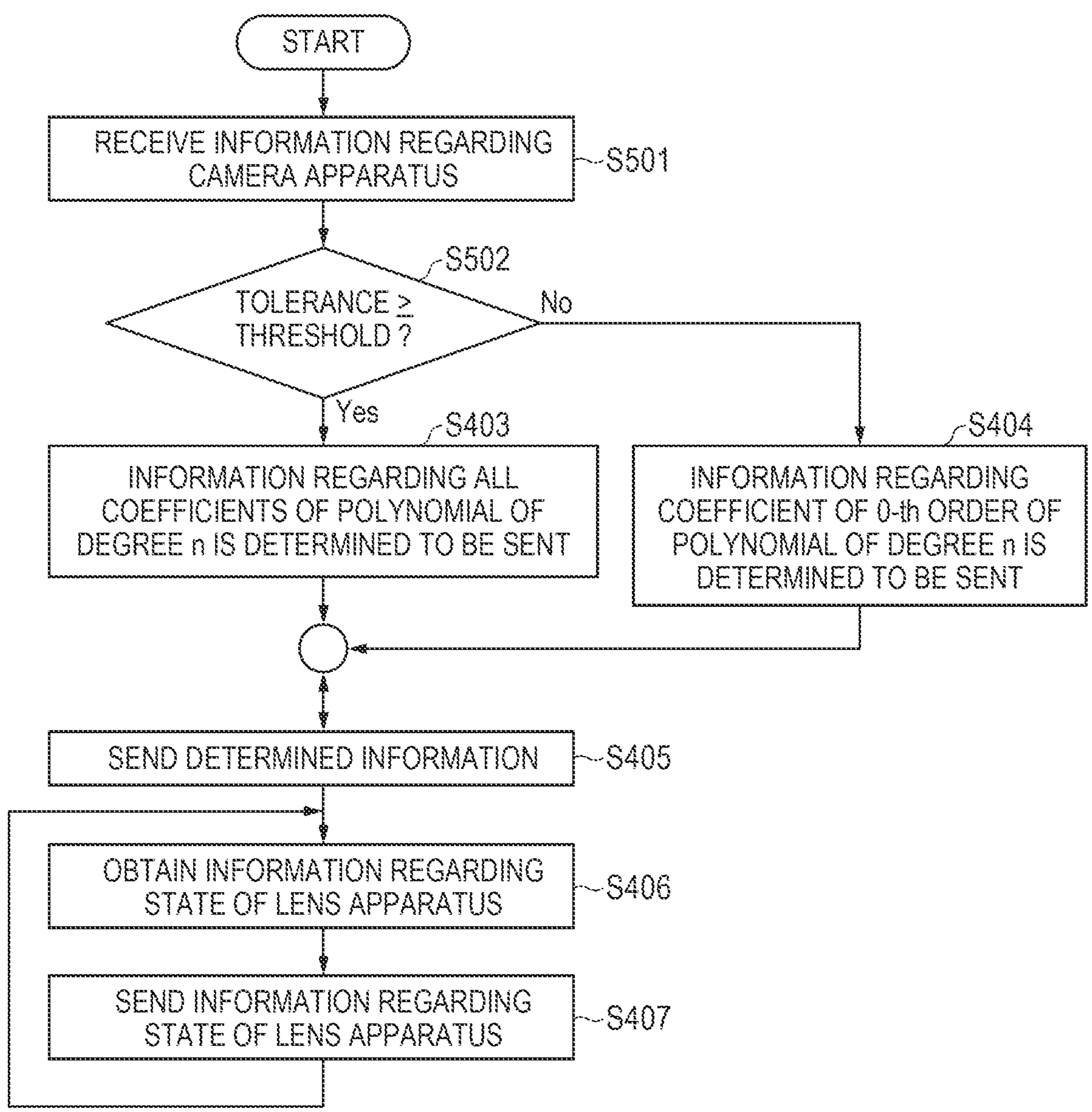
FIG. 14 is a diagram for illustrating an exemplified flow of processing in a fifth embodiment of the present invention.

FIG. 14 is a diagram for illustrating an exemplified flow of processing of the fifth embodiment. Differences of FIG. 14 from the flow of the processing of the fourth embodiment (FIG. 13) are described, and descriptions on portions of FIG. 14 that are the same as those in FIG. 13 are omitted. In Step S501 of FIG. 14, the lens communication device 120 of the lens apparatus 100 receives information about the camera apparatus 200 from (the camera communication device 220 of) the camera apparatus 200. The received information here includes information on a tolerance for the time required by the camera apparatus to receive the light amount compensation data (a tolerable time). In subsequent Step S502, the transmission information determining device 179 determines whether or not the tolerance in the information received in Step S501 is equal to or more than a threshold. The threshold may be the time required for the lens apparatus 100 to transmit information of the entire light amount compensation data (all coefficients of the n-th-order polynomial) in the data storage 178 of the lens apparatus to the camera apparatus 200. The processing proceeds to Step S403 when the result of the determination is positive ("yes"). The processing proceeds to Step S404 when the result of the determination is negative ("no"). Processing in Step S403, processing in Step S404, processing in step S405, processing in step S406, and processing in step S407 are the same as the processings in the fourth embodiment respectively.

The processing flow described above enables even a camera apparatus small in tolerance for the time required to receive the light amount compensation data (a camera short in tolerable time) to perform light amount compensation that is based on information of only the 0-th-order coefficient term (a constant) of the n-th-order polynomial and that is accordingly reduced significantly in required data reception time. The performed light amount compensation may be light amount compensation for a drop in light amount that is independent of the image height (what is called F drop). Cases in which the camera apparatus is completely incapable of executing light amount compensation processing can therefore be reduced. The lens apparatus 100 may be configured so as to transmit the light amount compensation data any time a request (an inquiry) is received from the camera apparatus 200. As described above, the lens apparatus provided according to the fifth embodiment is advantageous for light amount compensation processing in various camera apparatus, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash storage, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-169308, filed Sep. 11, 2018, and Japanese Patent Application No. 2019-015848, filed Jan. 31, 2019, which are hereby incorporated by reference herein in their entirety.

The invention claimed is:

1. A lens apparatus attachable and removable to a camera apparatus, the lens apparatus comprising a communication device configured to transmit, to an external device, information for light amount compensation of image data obtained by image pickup in the camera apparatus, wherein the information includes information of a coefficient $A_0$ of a term of 0-th-order with respect to an image height in a polynomial of n-th-order with respect to the image height, and wherein a conditional expression $$0.7<A_0(Z)\times(Fw/F(Z))^2<1.3$$

is satisfied where $A_0(Z)$ represents the coefficient $A_0$ at a zoom state Z different from a zoom state of a wide angle end, F(Z) represents an effective F-number at the zoom state Z, and Fw represents an effective F-number at the wide angle end.

2. A lens apparatus comprising a storage storing information for light amount compensation of image data obtained via the lens apparatus, wherein the information includes information of a coefficient $A_0$ of a term of 0-th-order with respect to an image height in a polynomial of n-th-order with respect to the image height, and wherein a conditional expression $$0.7<A_0(Z)\times(Fw/F(Z))^2<1.3$$

is satisfied where $A_0(Z)$ represents the coefficient $A_0$ at a zoom state Z different from a zoom state of a wide angle end, F(Z) represents an effective F-number at the zoom state Z, and Fw represents an effective F-number at the wide angle end.

3. The lens apparatus according to claim 2, wherein $A_0(Z)$ satisfies a conditional expression $$0.9<A_0(Z)\times(Fw/F(Z))^2<1.1.$$

4. The lens apparatus according to claim 2, wherein $A_0(Z)$ satisfies a conditional expression $$A_0(Z)\times(Fw/F(Z))^2\neq1.0.$$

5. The lens apparatus according to claim 2, wherein the lens apparatus further comprises a zoom lens unit, a focus lens unit, and an aperture stop, and wherein the information is with respect to each of a plurality of combinations of a state of the zoom lens unit, a state of the focus lens unit, and a state of the aperture stop.

6. The lens apparatus according to claim 5, further comprising an extender lens unit insertable into and removable from an optical path to change a focal length of the lens apparatus, wherein each of the plurality of combinations include a state of the extender lens unit.

7. The lens apparatus according to claim 6, wherein a conditional expression $$0.7<A_{0E}/(A_{00}\times B^2)<1.3$$

is satisfied where a coefficients $A_{00}$ represents the coefficient $A_0$ at a state in which the extender lens unit is not inserted into the optical path, coefficients $A_{0E}$ represents the coefficient $A_0$ at a state in which the extender lens unit is inserted into the optical path, and B represents a focal length changing magnification of the extender lens unit.

8. The lens apparatus according to claim 2, further comprising a user interface device configured to set a coefficient of the polynomial.

9. The lens apparatus according to claim 2, wherein n of the n-th-order is 3.

10. The lens apparatus according to claim 9, wherein a conditional expression $$-0.1<A2+6\times A3<0.3$$

is satisfied where A2 represents a coefficient of a term of second-order in the polynomial, and A3 represents a coefficient of a term of third-order in the polynomial.

11. The lens apparatus according to claim 2, wherein n of the n-th-order is 4.

12. The lens apparatus according to claim 11, wherein a conditional expression $$-0.1<A3+8\times A4<0.1$$

is satisfied where A3 represents a coefficient of a term of third-order in the polynomial, and A4 represents a coefficient of a term of fourth-order in the polynomial.

13. The lens apparatus according to claim 2, comprising a first lens unit, closest to an object of all lens units, configured not to be moved for zooming, and including a sub unit configured to be moved for focusing.

14. The lens apparatus according to claim 13, wherein conditional expressions $$0.7<A_0(Zw)/A_0(Zt\times Fw/Ft)<1.3,\text{ and}$$

$$0.7<A_0((Zw+Zt\times Fw/Ft)/2)/A_0(Zt\times Fw/Ft)<1.3$$

are satisfied where Zw represents a focal length at the wide angle end, Zt represents a focal length at a telephoto end, Ft represents an effective F-number at the telephoto end, $A_0(Zw)$ represents the coefficient $A_0$ with respect to the focal length Zw, $A_0$(Ztx Fw/Ft) represents the coefficient $A_0$ with respect to a focal length Ztx Fw/Ft, and $A_0$((Zw+Ztx Fw/Ft)/2) represents the coefficient $A_0$ with respect to a focal length (Zw+ZtxFw/Ft)/2.

15. The lens apparatus according to claim 1, wherein the communication device is configured to transmit only the coefficient $A_0$ of coefficients of the polynomial to the external device.

16. The lens apparatus according to claim 1, comprising a zoom lens unit, a focus lens unit, and an aperture stop, wherein the information is with respect to each of a plurality of combinations of a state of the zoom lens unit, a state of the focus lens unit, and a state of the aperture stop, and wherein the communication device is configured to transmit information with respect to one of the plurality of combinations at each point in time to the external device.

17. An image pickup apparatus comprising:

a lens apparatus according to claim 2; and an image pickup element, wherein the storage stores the information for light amount compensation of image data obtained via the image pickup element picking up an image formed by the lens apparatus.

18. A processing apparatus configured to receive the information from the lens apparatus of claim 2, and configured to execute processing for light amount compensation of the image data based on the received information.

19. A camera apparatus comprising the processing apparatus of claim 18.

20. A lens apparatus attachable and removable to a camera apparatus, the lens apparatus comprising:

a communication device configured to transmit, to the camera apparatus, information for light amount compensation of image data obtained by image pickup in the camera apparatus; and a processor, wherein the information includes information of coefficients of terms of a polynomial of n-th-order with respect to an image height, n being an integer not less than 1, wherein a coefficient of a term of 0-th-order with respect to the image height in the polynomial is a coefficient that varies depending on a zoom state of the lens apparatus, and wherein the processor is configured to cause the communication device to transmit information of only the coefficient of the term of 0-th-order of the coefficients of the terms, based on information about the camera apparatus.

21. The lens apparatus according to claim 20, wherein the communication device is configured to receive the information about the camera apparatus from the camera apparatus.

22. The lens apparatus according to claim 20, wherein the processor is configured to cause the communication device to transmit information about the zoom state.

23. The lens apparatus according to claim 20, wherein the coefficients of the terms are coefficients that vary depending on the zoom state of the lens apparatus, a focus state of the lens apparatus, and an aperture stop state of the lens apparatus.

24. The lens apparatus according to claim 20, wherein the information about the camera apparatus is information about a resource available for the camera apparatus to use for the light amount compensation.

25. The lens apparatus according to claim 24, wherein the processor is configured to cause the communication device to transmit information of only the coefficient of the term of 0-th-order in a case where an amount of the resource is less than a threshold.

26. The lens apparatus according to claim 20, wherein the information about the camera apparatus is information about a length of time for the camera apparatus to allow for transmission of the information for the light amount compensation.

27. The lens apparatus according to claim 26, wherein the processor is configured to cause the communication device to transmit information of only the coefficient of the term of 0-th-order in a case where the length of time is less than a threshold.

28. The lens apparatus according to claim 20, wherein n of the n-th-order is not less than 3.

29. An image pickup apparatus comprising:

the lens apparatus of claim 20; and a camera apparatus including an image pickup element configured to receive an image formed by the lens apparatus with the lens apparatus mounted on the camera apparatus.

* * * * *